(12) United States Patent
Imanaka et al.

(10) Patent No.: US 8,404,134 B2
(45) Date of Patent: Mar. 26, 2013

(54) METHOD FOR MANUFACTURING ELECTRODE FOIL

(75) Inventors: Yoshihiko Imanaka, Kawasaki (JP); Hitoshi Yamada, Kawasaki (JP); Hideyuki Amada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/366,874

(22) Filed: Feb. 6, 2009

(65) Prior Publication Data

US 2009/0212013 A1 Aug. 27, 2009

(30) Foreign Application Priority Data

Feb. 22, 2008 (JP) ................... 2008-041981

(51) Int. Cl.
*B31D 3/00* (2006.01)
(52) U.S. Cl. ............ 216/56; 216/13; 361/503; 361/516; 428/210; 428/426; 428/457
(58) Field of Classification Search .................. 361/503, 361/505, 311; 438/329; 347/6; 428/689; 216/56
See application file for complete search history.

(56) References Cited

U.S. PATENT DOCUMENTS

| 4,307,165 A | * | 12/1981 | Blazey et al. ............ 430/8 |
| 5,540,772 A | * | 7/1996 | McMillan et al. ........... 118/50 |
| 6,933,041 B2 | * | 8/2005 | Katsir et al. ............ 428/210 |
| 7,326,640 B2 | * | 2/2008 | Aoh et al. ............ 438/617 |
| 2003/0068509 A1 | * | 4/2003 | Shah et al. ............ 428/472 |

FOREIGN PATENT DOCUMENTS

| JP | 2006-142159 A | 6/2006 |
| KR | 2007-0062392 A | 6/2007 |
| WO | WO 97/34954 | * 3/1997 |

OTHER PUBLICATIONS

J. Roberson, High dielectric constant oxides, The European Physical Lournal, vol. 28, p. 265-291 Dec. 2004.*
Korean Office Action dated Nov. 17, 2010, issued in corresponding Korean Patent Application No. 10-2009-13903.
N. Isaya, "Electrolytic Solution Cathode Aluminum Electrolytic Capacitor", What a Condenser is, pp. 13-20, 1.3.2., 1997.
J. Akedo, et al., "Ceramics Coating Based on Impact Adhesion Phenomenon with Ultrafine Particles—Aerosol Deposition Method for High Speed Coating at Low Temperature", Materia Japan, 2002, pp. 459-466, vol. 41, No. 7.
Y. Imanaka et al., "Passive Integration Technology for Microwave Application Using Aerosol Deposition", Ceramics, 2004, pp. 584-589, vol. 39, No. 8.

* cited by examiner

*Primary Examiner* — Duy Deo
*Assistant Examiner* — Erin Bergner
(74) *Attorney, Agent, or Firm* — Westerman, Hattori, Daniels & Adrian, LLP

(57) ABSTRACT

A method of manufacturing a electrode foil composed of a valve metal layer of a first valve metal and a metal foil of a second valve metal supporting the valve metal layer, the method includes coating fine particles of the first valve metal with a resin to form composite fine particles, forming the composite fine particles into an aerosol, jetting the aerosol to the metal foil in an atmosphere under a reduced pressure, depositing the composite fine particles onto the metal foil to form a aerosol deposition layer, and removing selectively the resin from the aerosol deposition layer to form the valve metal layer.

15 Claims, 23 Drawing Sheets

METHOD FOR MANUFACTURING ELECTRODE FOIL

CROSS-REFERENCE TO RELATED APPLICATION

This application is based upon and claims the benefit of priority of the prior Japanese Patent Application No. 2008-041981, filed on Feb. 22, 2008, the entire contents of which are incorporated herein by reference.

BACKGROUND OF THE INVENTION

1. Field of the Invention

The present invention relates to a method for manufacturing an electrode foil which is used as an anode foil of an electrolytic capacitor.

2. Description of Related Art

A metal foil for aluminum electrolytic capacitor is manufactured using a foil, as a starting material, which is formed by rolling aluminum having a high purity of 98% or more.

FIG. 24 is a schematic view illustrating a cross-section of an anode foil (aluminum foil 2) of an aluminum electrolytic capacitor.

The aluminum foil 2 formed by a rolling treatment is immersed in an acidic solution or is electrolytically etched in an acidic or an alkaline solution to form numerous number of etching pits 4 on the surface, so that an effective surface area of the aluminum foil 2 is increased. This etching treatment is also called a surface roughing treatment.

By the etching method described above, the magnification (ratio of an effective foil area obtained by surface roughing to a smooth foil area) per unit area is several hundreds times, that is, approximately 300 to 400 times.

In addition, by a chemical conversion treatment which anodizes an aluminum foil having an increased surface area as described above to form an extremely thin oxide film, a dielectric layer is formed which separates an anode composed of an aluminum foil and a practical cathode composed of an electrolytic solution (cf. "Electrolytic Solution Cathode Aluminum Electrolytic Capacitor" by Isaya NAGATA of Japan Capacitance Industrial Co., Ltd., published in 1997).

In an aluminum electrolytic capacitor as described above using a metal foil as an anode foil, the surface area of an electrode is extremely large, and a dielectric layer is extremely thin. Accordingly, an electrostatic capacitance per unit area (unit area obtained when the electrode foil is assumed to be smooth) of the electrode is large, and hence an aluminum electrolytic capacitor having a small size and a large capacitance can be advantageously obtained.

However, the reduction in size of electronic devices demands further reduction in size and increase in capacitance of electrolytic capacitors in the market.

In order to increase the capacitance of an electrolytic capacitor, it is effective to increase an effective surface area of an electrode by performing an intensive etching treatment performed on an aluminum foil.

FIG. 25 illustrates a schematic view showing a cross-section of the aluminum foil 2 processed by an intensive etching treatment. When the intensity of an etching treatment is excessively increased, the etching pits 4 will be formed to reach a deep area of the aluminum foil 2, as a result, the metal foil becomes brittle, and the strength thereof is decreased.

Accordingly, heretofore, when it is intended to increase the capacitance of an electrolytic capacitor, the thickness of an aluminum foil used as a starting material is increased, and an etching treatment is then performed, so that the surface area of the metal foil is increased while the foil strength is maintained.

By the method described above, the capacitance per unit area is increased; however, since a thick aluminum foil is used, the volume obtained after winding is unfavorably increased in the case of a winding type electrolytic capacitor. This increase in volume is against the requirement for reduction in size.

As with the case described above, when a laminated type solid electrolytic capacitor is formed, the volume is also increased when aluminum foils are laminated to each other, and this increase in volume is against the requirement for reduction in size.

That is, it is difficult to meet further requirements from the market for increase in capacitance and reduction in size by a conventional etching method as a surface roughing method.

SUMMARY

In order to achieve the above object, according to a first aspect of the present invention, there is provided a method for manufacturing a metal foil which is formed of a metal foil composed of a second valve metal and a valve metal layer tightly fixed thereto, the valve metal layer being formed of one group of metal fine particles which are composed of a first valve metal and which are tightly adhered to each other so as to form fine voids therebetween, the method comprising: a first step in which fine particle groups composed of the first valve metal coated with a resin are formed into an aerosol, the fine particle groups formed into an aerosol are jetted to the metal foil in vacuum, and an aerosol deposition layer formed of the fine particle groups which are tightly adhered to each other is tightly fixed to the metal foil; and a second step of selectively removing the resin from the aerosol deposition layer to form the valve metal layer.

According to the first aspect, while the thickness of the foil approximately equivalent to that of a conventional electrode foil is maintained, the strength can be increased and, in addition, the surface area of the electrode foil can be significantly increased.

According to a second aspect of the present invention, there is provided a method for manufacturing a metal foil which is formed of a metal foil composed of a second valve metal and a valve metal layer tightly fixed thereto, the valve metal layer being formed of metal fine particles which are composed of a valve metal made of a first valve metal and which are tightly adhered to each other so as to form fine voids therebetween, the method comprising: a first step in which a mixture formed of a first fine particle group composed of the first valve metal and a second fine particle group composed of a resin is formed into an aerosol, the mixture formed into an aerosol is jetted to the metal foil in vacuum, and an aerosol deposition layer formed of fine particles of the mixture which are tightly adhered to each other is tightly fixed to the metal foil; and a second step of selectively removing the resin from the aerosol deposition layer to form the valve metal layer.

According to the second aspect, while the thickness of the foil approximately equivalent to that of a conventional electrode foil is maintained, the strength can be further increased and, in addition, the surface area of the electrode foil can be significantly increased.

According to a third aspect of the present invention, there is provided a method for manufacturing a metal foil which is formed of a metal foil composed of a second valve metal and a valve metal layer tightly fixed thereto, the valve metal layer being formed of metal fine particles which are composed of a valve metal made of a first valve metal and which are tightly adhered to each other so as to form fine voids therebetween, the method comprising: a first step in which a mixture is formed into an aerosol which is formed of a first fine particle group composed of the first valve metal and coated with a first resin and a second fine particle group coated with a second resin and composed of a ceramic having a higher dielectric constant than that of an oxide film obtained by a chemical conversion treatment of the first valve metal and having a particle diameter smaller than that of the first fine particle group, the mixture formed into an aerosol is jetted to the metal foil in vacuum, and an aerosol deposition layer formed of fine particles of the mixture which are tightly adhered to each other is tightly fixed to the metal foil; and a second step of selectively removing the first and the second resins from the aerosol deposition layer to form the valve metal layer.

According to the third aspect, while the thickness of the foil approximately equivalent to that of a conventional electrode foil is maintained, the strength can be further increased and, in addition, the surface area of the electrode foil can be significantly increased.

According to a fourth aspect of the present invention, the metal foil is preferably an aluminum foil in the first to the third aspects.

According to a fifth aspect of the present invention, the aluminum foil is preferably processed by an etching treatment so that the surface area thereof is increased in the fourth aspect.

According to a sixth aspect of the present invention, the valve metal layer and the metal foil are preferably processed by a chemical conversion treatment in the first to the fifth aspects.

According to a seventh aspect of the present invention, the second valve metal is preferably one valve metal selected from the group consisting of aluminum, titanium, tantalum, niobium, an aluminum alloy, a titanium alloy, a tantalum alloy, and a niobium alloy in the first to the fifth aspects.

DESCRIPTION OF THE PREFERRED EMBODIMENTS

Hereinafter, embodiments will be described with reference to figures. However, the technical scope of the present invention is not limited to the following embodiments but encompasses items described in the claims and the equivalents thereof.

Embodiment 1

This embodiment relates to a method for manufacturing an electrode foil (anode foil) for electrolytic capacitor. The method comprises: aerosolizing fine particles composed of a valve metal, such as aluminum, coated with a resin such as acrylic resin; and jetting the fine particles into an aerosol to a metal foil such as an aluminum foil to form the electrode foil.

(i) Overall Structure

Figure 1:
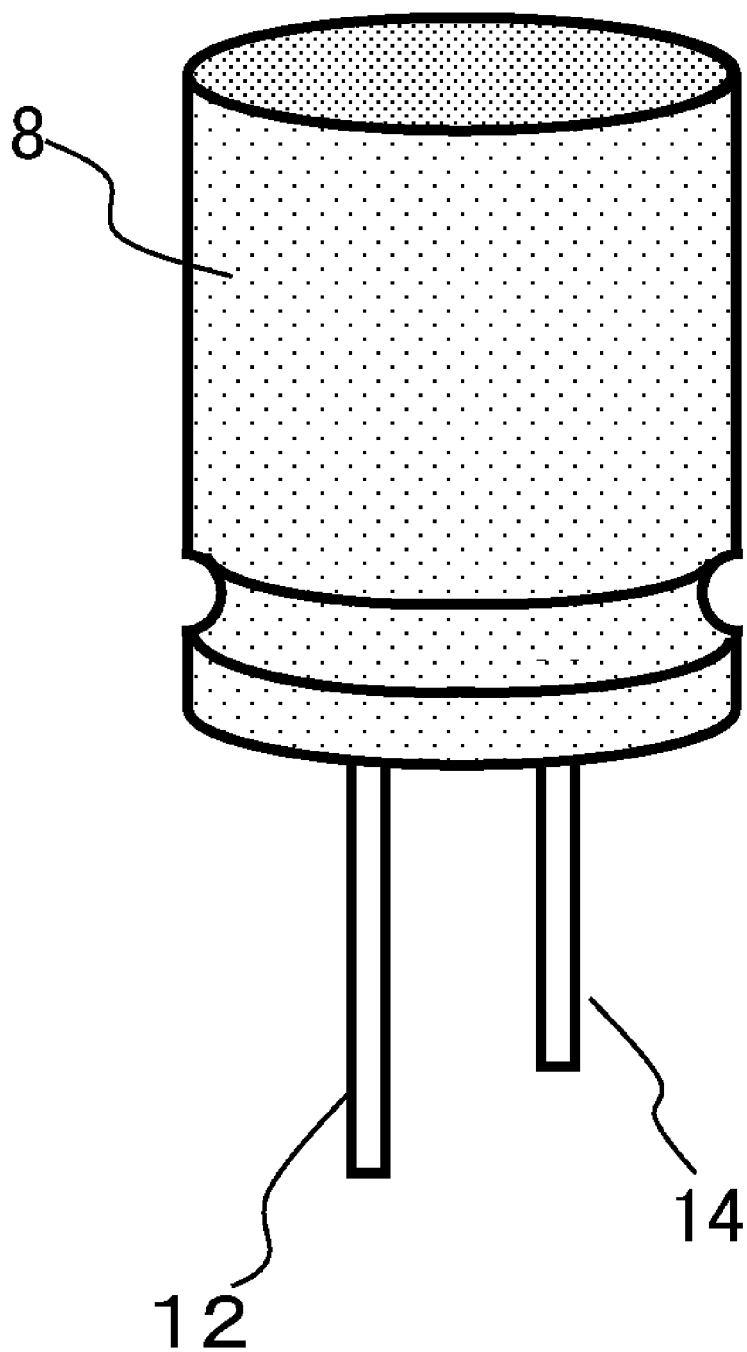
FIG. 1 illustrates a perspective view showing an overall of a winding type electrolytic capacitor using an electrode foil as an anode foil according to the first embodiment.
Figure 2:
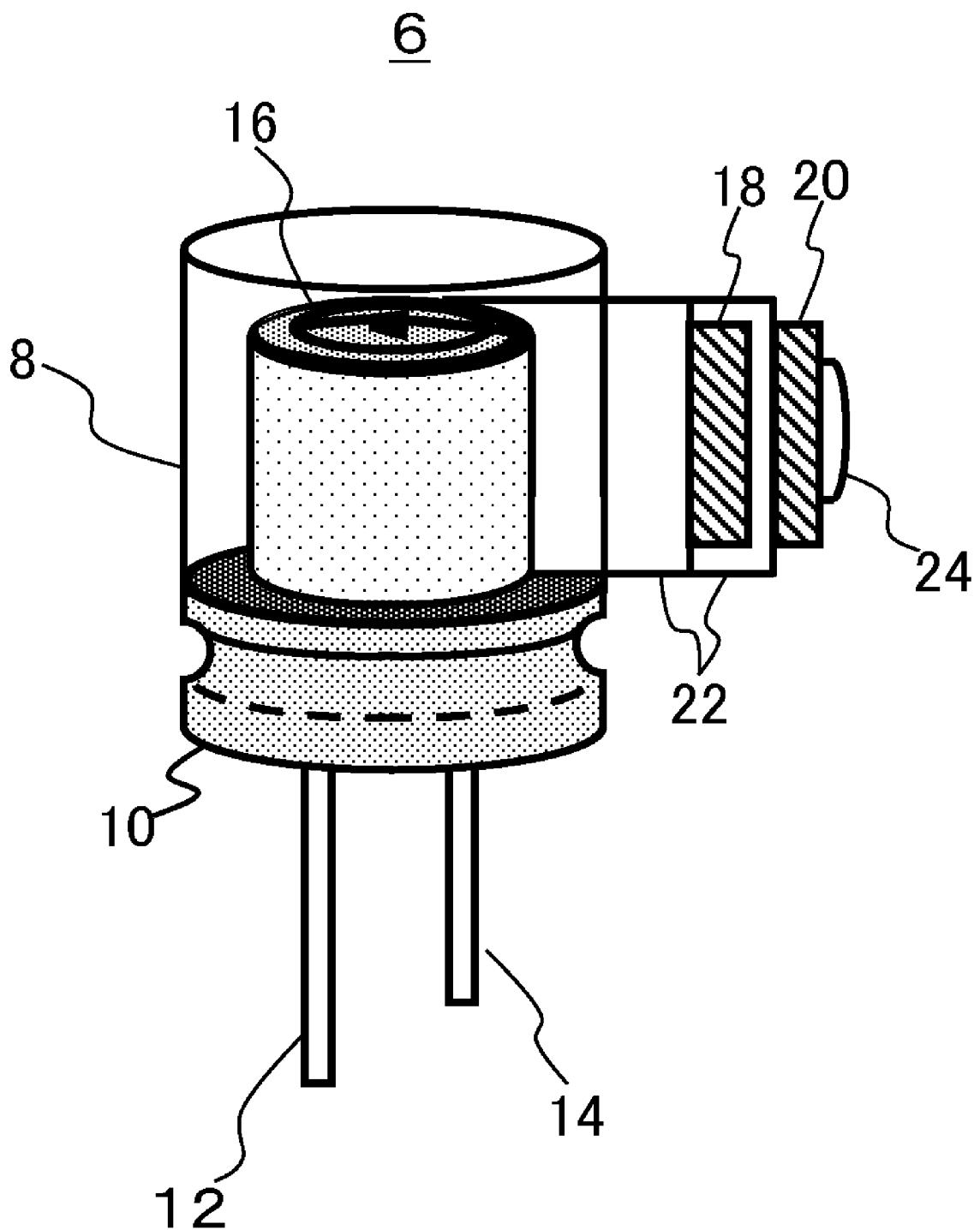
FIG. 2 illustrates a perspective view showing the inside of the winding type electrolytic capacitor by removing an exterior package (metal case)

FIG. 1 illustrates a perspective view showing an overall of a winding type electrolytic capacitor 6 in which an electrode foil of this embodiment is used as an anode foil. FIG. 2 illustrates a view perspectively showing the inside of the winding type electrolytic capacitor 6 by removing an exterior package or metal case 8. An anode lead 12 and a cathode lead 14 are fixed by a sealing body 10 made of insulating resin.

A wound capacitor element 16 is fixed to the sealing body 10 and placed inside the exterior package 8, and the anode lead 12 and the cathode lead 14 are electrically connected to an anode foil 18 which uses the electrode foil of this embodiment and a cathode foil 20, respectively.

The anode and the cathode foils 18, 20 are wound with an electrolytic paper 22 as a separator interposed therebetween, and the terminal ends are fixed by a winding-stop tape 24, so that the winding state is maintained.

(ii) Structure of Electrode Foil

Figure 3:
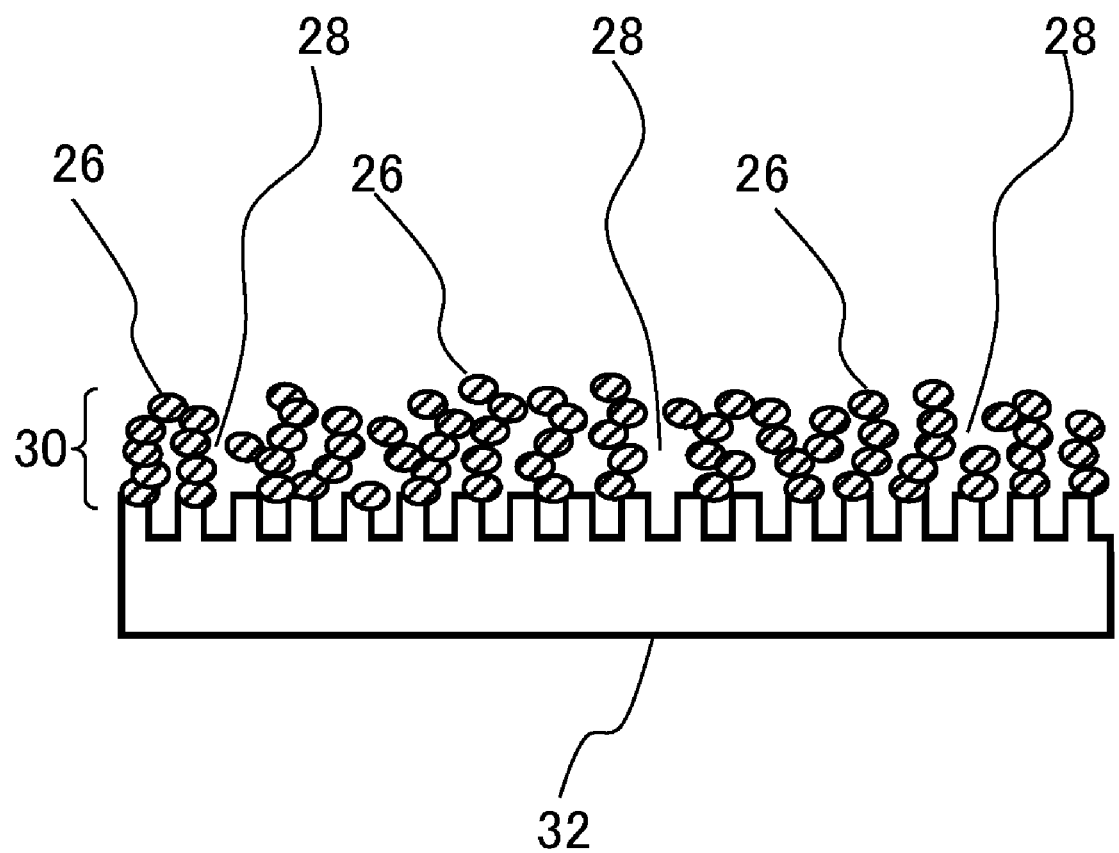
FIG. 3 illustrates a cross sectional view of the electrode foil (anode foil) manufactured according to the first embodiment.

FIG. 3 is a cross-sectional view of the electrode foil (anode foil) manufactured in this embodiment.

An electrode foil 24 manufactured in this embodiment has a structure in which a valve metal layer 30 is tightly fixed to a metal foil 32 composed of a second valve metal such as aluminum. The valve metal layer 30 is formed of one group of metal fine particles 26. Each of the metal fine particles 26 is composed of a first valve metal such as aluminum and the metal fine particles are tightly adhered to each other so as to form fine voids 28 therebetween. In this embodiment, the metal fine particles 26 forming the valve metal layer 30 are each electrically connected to the metal foil 32. In this case, the width of each of the fine voids 28 is preferably in the range of 100 nm to 100 μm.

Furthermore, the surfaces of the valve metal layer 30 and the metal foil 32 are oxidized. By the oxidization, the entire surface of the electrode foil 24 including the valve metal layer 30 is covered with a dielectric oxide film layer such as $Al_2O_3$ (no shown in the figure). The same as described above is performed in the following embodiments 2 to 5.

In this embodiment, in order to simplify the description, an example in which the valve metal layer 30 is formed only one surface of the metal foil 32 will be described. However, in order to reduce the size of an electrolytic capacitor, the valve metal layer 30 is preferably formed on both surfaces of the metal foil 32. The same as described above is preferable also in the following embodiments 2 to 5.

(iii) Manufacturing Method

Hereinafter, a method for manufacturing the electrode foil 24 shown in FIG. 3 will be described. However, it is assumed that members forming the electrode foil 24 are formed of the materials such as aluminum and $Al_2O_3$ described in the above "(ii) Structure of Electrode Foil" by way of example.

Figure 4:
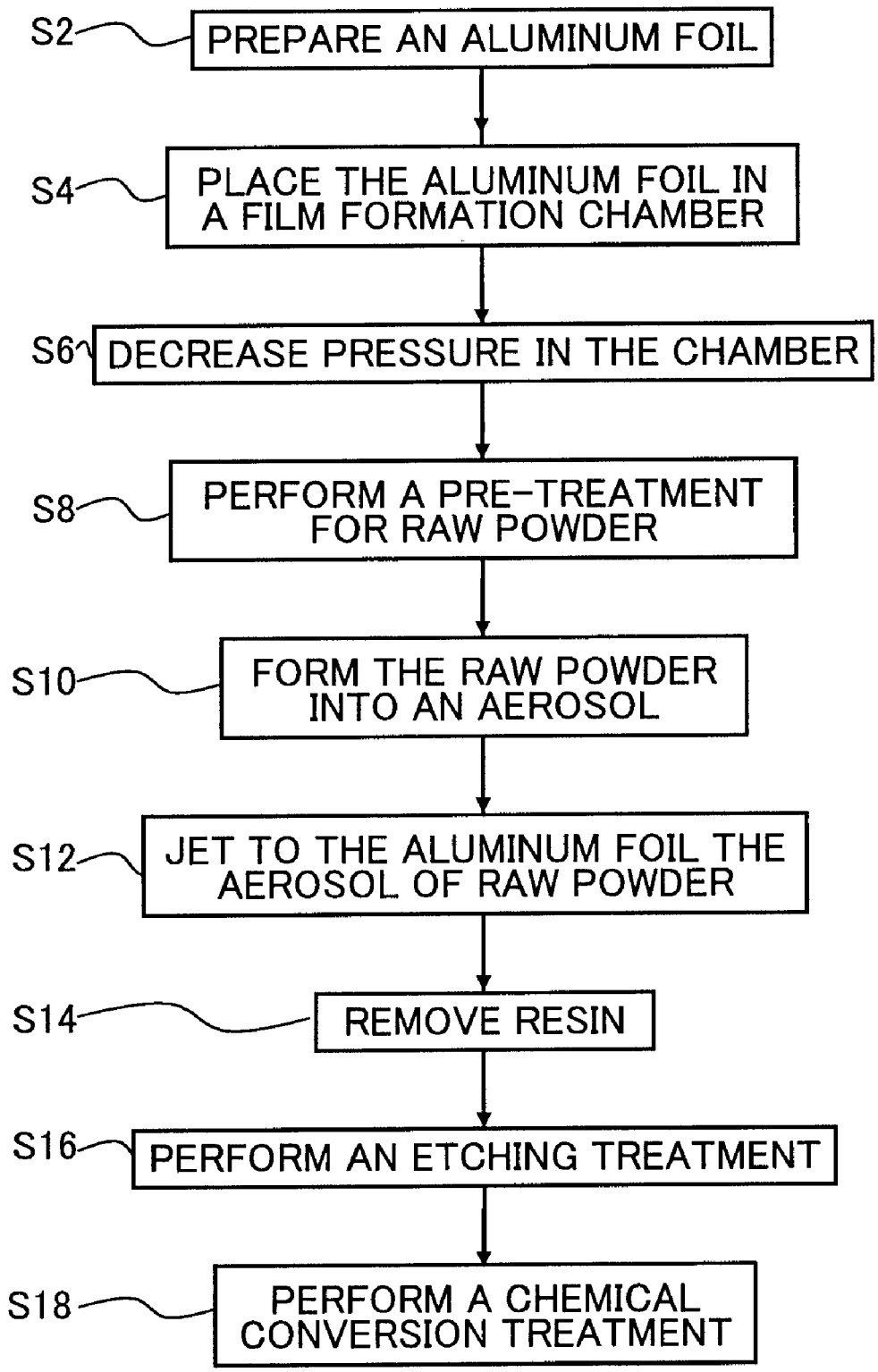
FIG. 4 illustrates a flowchart showing a procedure of the method for manufacturing an electrode foil (anode foil) of the first and the third embodiments.
Figure 5A:
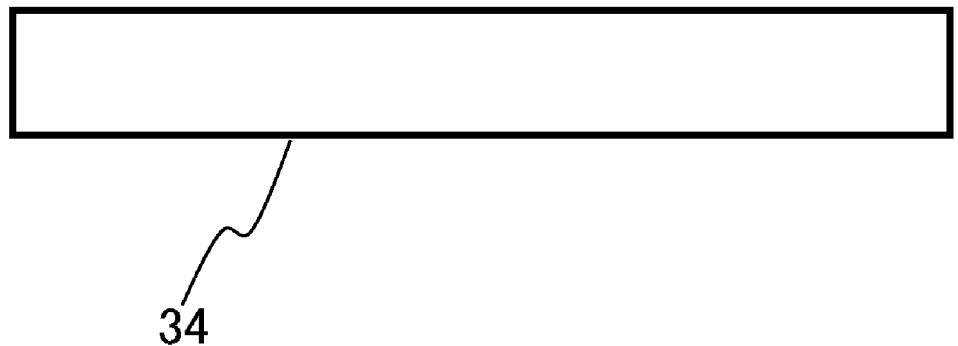
FIGS. 5A and 5B illustrate processing steps according to the first embodiment.
Figure 5B:
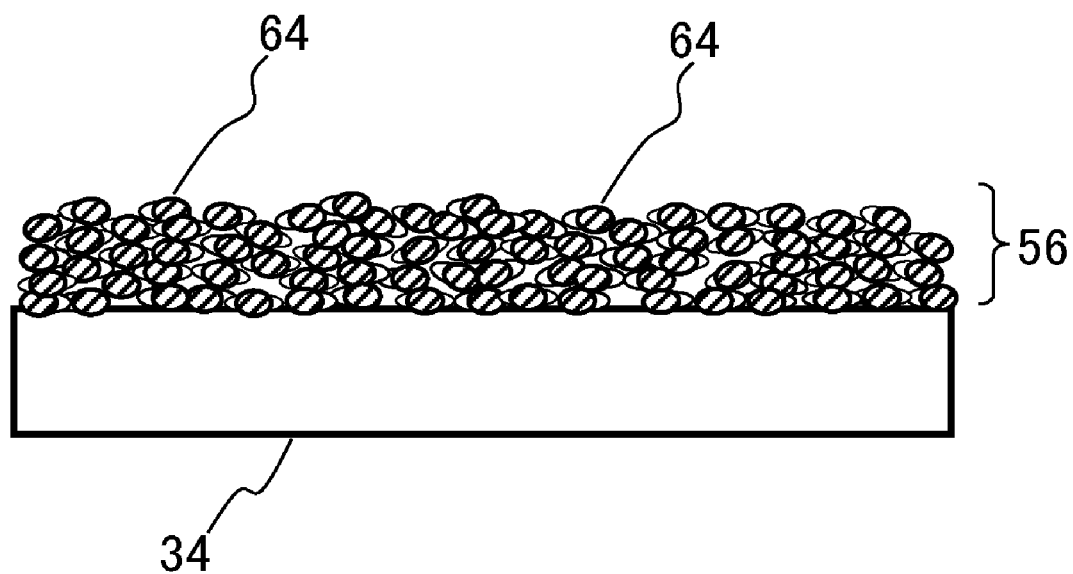

FIG. 4 is a flowchart showing a procedure of the method for manufacturing an electrode foil (anode foil) of this embodiment. FIGS. 5 and 6 illustrate views showing states showing process steps shown in FIG. 4.

First, an aluminum foil 34 having a thickness of 40 μm and a purity of 99% formed by a rolling method is prepared (Step S2; FIG. 5A).

Figure 7:
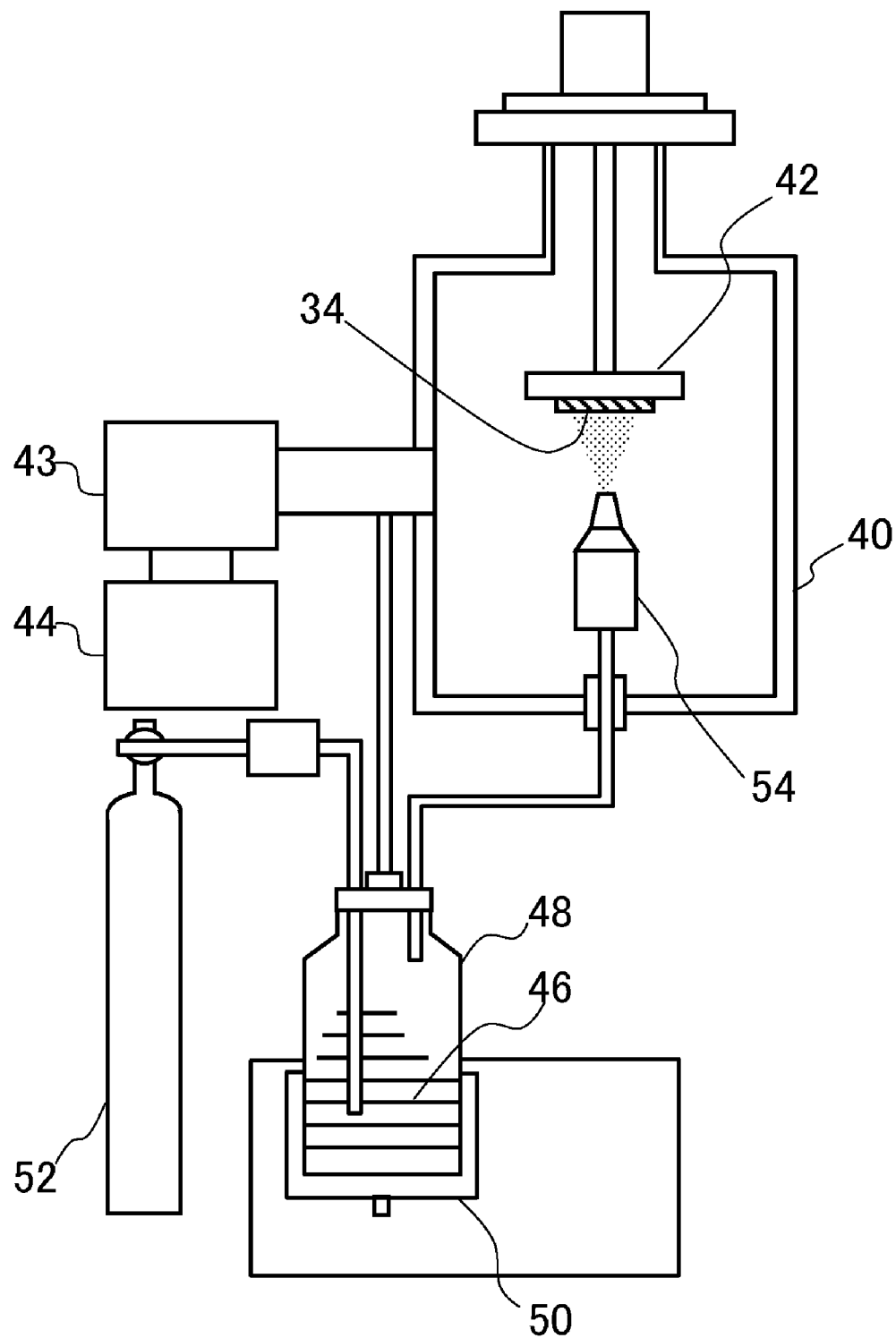
FIG. 7 illustrates a schematic diagram of the aerosol deposition apparatus.

A surface treatment is performed on the aluminum foil 34 thus prepared by an aerosol deposition apparatus 38 shown in FIG. 7. FIG. 7 is a view illustrating a schematic structural example of the aerosol deposition apparatus 38.

A film formation chamber 40 has a stage 42 movable in X and Y directions, and the rolled aluminum foil 34 prepared in Step S2 is stuck on the stage 42 (Step S4).

The film formation chamber 40 is evacuated beforehand by a booster pump 43 and a vacuum pump 44 to 10 pascals or less (Step S6).

A starting material powder 46 is poured into an aerosol generation container 48. The starting material power 46 is a fine particle group composed of fine particles formed of aluminum having an average particle diameter of 3 μm and coated with an acrylic resin. Then a pre-treatment is performed for removing moisture absorbed on powder surfaces (Step S8). In the pre-treatment, the aerosol generation container 48 heated at approximately 150° C. is depressurized for 30 minutes, while the whole container 48 is exposed to ultrasonic waves generated with a vibrator 50. The aluminum fine particles processed by resin coating can be easily formed, for example, by a so-called spray dryer method. In addition, the thickness of the coating layer is preferably in the range of 100 nm to 1 μm.

Next, a high purity helium gas 52 (gas pressure: 2 kg/cm², gas flow rate: 10 l/min.) is introduced in the aerosol generation container 48, and the starting material powder 46 processed by the pre-treatment is formed into an aerosol (formation of floating powder dust) (Step S10).

Figure 8:
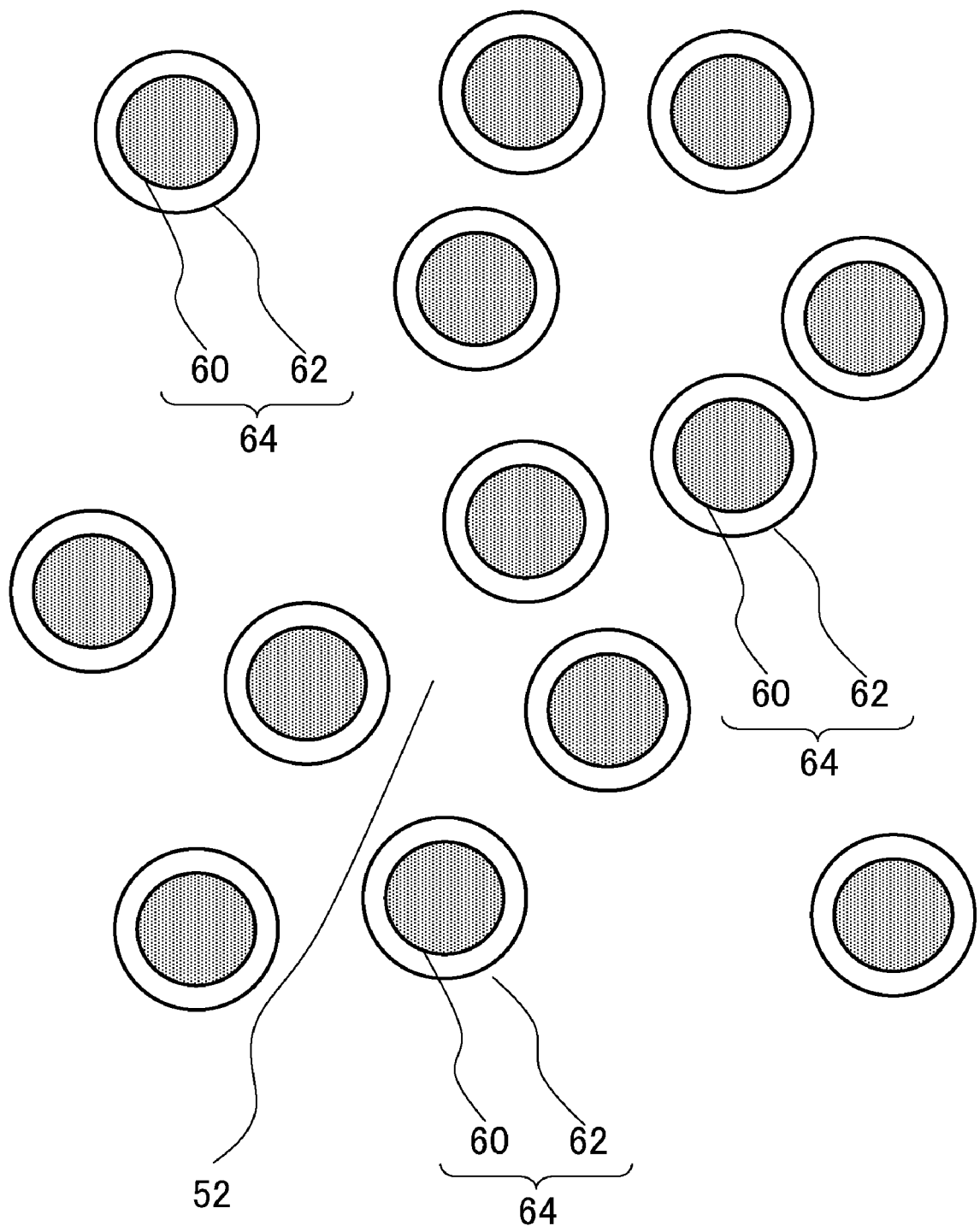
FIG. 8 illustrates a schematic view showing the state of aluminum fine particles with a resin which are formed into an aerosol.

FIG. 8 is a schematic view illustrating the state of aluminum fine particles which are formed into an aerosol as described above. As shown in FIG. 8, aluminum fine particles 60 each covered with a coating layer 62 composed of an acrylic resin are floating in the helium gas 52 introduced in the aerosol generation container 48, so that an aerosol state is formed.

Next, this aerosol is fed into the film formation chamber 40 by a nozzle 54 via a pipe. As the nozzle 54, a nozzle having a spiral groove formed inside is used. The starting material powder formed into an aerosol is jetted for 3 minutes to the aluminum foil 34 from the nozzle 54 having a spiral groove inside (Step S12). While the aerosol is jetted, the pressure inside the apparatus is maintained at a constant value of 500 Pa.

In this step, aluminum fine particles 64 coated with an acrylic resin in the aerosol strikes against the aluminum foil 34 at a high speed higher than the acoustic velocity. The impact generated by this collision allows the aluminum particles 60 to break through the acrylic resin 62. Then the aluminum particles 60 adhere to the aluminum foil 34 or to aluminum particles 60 which previously collided therewith, and deform to form an aerosol deposition layer 56 (see FIG. 3).

By the aerosol deposition as described above, the aerosol deposition layer 56 is formed to have a thickness of approximately 20 μm on the upper surface of the aluminum foil 34 (see FIG. 5(*b*)). In addition, by the procedure as described above, the aerosol deposition layer 56 may also be formed on two surfaces of the substrate aluminum foil 34 (the same as described above can also be performed in embodiments 2 to 5).

Next, after this aerosol deposition layer 56 is immersed in an organic solvent such as acetone together with the aluminum foil 34, ultrasonic waves are applied thereto, so that the resin 62 applied to the aluminum fine particles 60 are selectively removed (Step S14). This selective removal can be performed by using a chemical reagent, such as an organic solvent, which dissolves a resin but does not dissolve aluminum (metal) instead of a chemical reagent, such as an acid, dissolving aluminum.

Figure 6A:
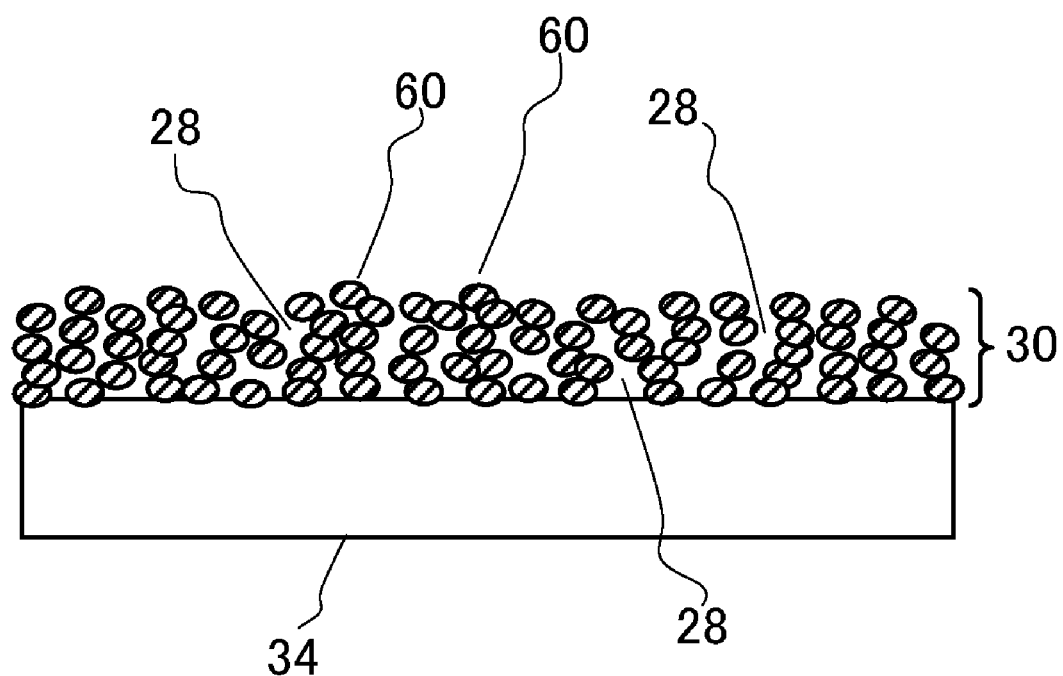
FIGS. 6A and 6B illustrate processing steps according to the first embodiment.

As a result, the fine voids 28 are formed in a space occupied by the acrylic resin, and the valve metal layer 30 composed of the aluminum particles 60 which are tightly adhered to each other to form fine voids is formed (see FIG. 6A). The surface area of the valve metal layer 30 is significantly increased by the formation of the fine voids.

Subsequently, the valve metal layer 30 is heated in an inert gas to 80° C. together with the aluminum foil 34 so as to evaporate the organic solvent.

Next, the valve metal layer 30 is annealed in an inert gas together with the aluminum foil 34 at a temperature of 300°

C., which is equivalent to or less than a melting point (660° C.) of aluminum, so that bonding between the aluminum particles is enhanced.

Then this aluminum foil is processed by an electrolytic treatment in a mixed aqueous solution of hydrochloric acid, nitric acid, and $AlCl_3$ at a current density of $0.2 A/m^2$ (50 Hz) for 8 minutes, so that an etching treatment (surface roughing treatment) is performed (Step S16).

Figure 6B:
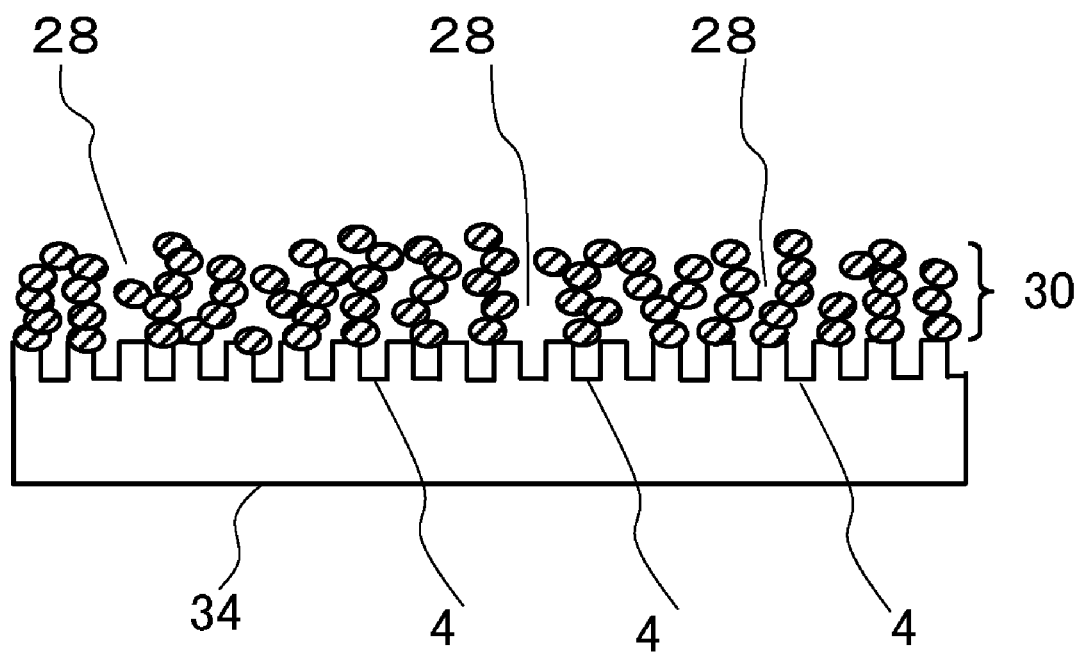

By this etching treatment, the fine voids 28 are further expanded and, in addition, etching pits 4 are also formed in the aluminum foil 34 (see FIG. 6B). As a result, the overall surface area of the aluminum foil 34 including the valve metal layer 30 is further increased, and the surface area thereof is significantly increased as compared to an aluminum foil processed only by a surface roughing treatment.

Subsequently, a chemical conversion treatment is performed in an ammonium borate/adipic acid ammonium aqueous solution (Step S18).

The surface of the valve metal layer 30 and that of the aluminum foil 34 are oxidized by this chemical conversion treatment, a dielectric oxide film layer having a large dielectric constant covers the entire surface of the aluminum foil 34 including the valve metal layer 30.

By the steps as described above, the electrode foil 24 according to this embodiment described with reference to FIG. 3 is formed.

(iv) Characteristics

The tensile strength, leak current (leak current through the dielectric oxide film layer formed by the chemical conversion treatment in Step S14), and electrostatic capacitance per unit area of the electrode foil 24 formed by the process flow shown in FIG. 4 were measured. However, the tensile strength was measured using a sample which was composed of the aluminum foil 34 and the two valve metal layers 30 provided on the two surfaces thereof and which had a thickness of 80 μm (=aluminum foil of 40 μm+valve metal layer of 20 μm+valve metal layer of 20 μm).

In this measurement of the tensile strength, a test piece having a width of 1 cm and a length of 5 cm was obtained by cutting and was pulled at a rate of 10 mm/min by a tensile testing apparatus, so that a breaking strength was measured. The strength was not normalized by the thickness but was defined by a two-dimensional shape of the test piece. The leak current was measured 30 minutes after the voltage reaching a predetermined voltage of 20 V.

As the measurement results of the above electrode foil 24, the tensile strength was 2.2 kg/cm, the leak current was 0.9 $\mu A/cm^2$, and the electrostatic capacitance was 200 $\mu F/cm^2$.

For comparison purpose, an aluminum foil of the same specification as that used in this embodiment was processed by the same method as described above except for the aerosol deposition, so that an electrode foil was formed. That is, the electrode foil was formed by an etching method and was used as a sample for comparison purpose. However, in order to prepare a sample having the same thickness as that of the above sample for strength measurement, a sample for tensile strength comparison was formed using an aluminum foil having a thickness of 80 μm as a starting material.

The tensile strength, leak current, and electrostatic capacitance of the samples for comparison purpose were measured under the same conditions as described above. As the measurement results of the samples for comparison purpose, the tensile strength was 1.5 kg/cm, the leak current was 1.0 $\mu A/cm^2$, and the electrostatic capacitance was 40 $\mu F/cm^2$. The manufacturing method and the measurement results of the samples for comparison purpose will be described in detail in a comparative example described below. In addition, the measurement results of the electrode foil manufactured in accordance with this embodiment and the comparative example will be collectively shown in the following Table 1. The measurement results of electrode foils manufactured in accordance with the following embodiments 2 to 5 are also shown as described above.

As shown by the above measurement results, compared to the electrode foil formed by a conventional etching method, the strength of the electrode foil 24 formed by the process flow shown in FIG. 4, that is, by the aerosol deposition method, is increased by approximately 1.5 times in tensile strength, the leak current is approximately equivalent, and the electrostatic capacitance is increased by approximately 5 times.

That is, according to this embodiment, compared to the electrode foil formed by a conventional etching method, an electrode foil can be manufactured in which the electrostatic capacitance per unit area is significantly increased and further the mechanical strength is also increased. Those described above are obtained due to a significant increase in the surface area of the electrode foil by the fine voids 28 which are densely and uniformly formed in the valve metal layer 30 and due to strength reinforcement by the valve metal layer 30 which is strongly formed.

Incidentally, the tensile strength of the electrode foil manufactured in this embodiment was high, such as 2.2 kg/cm; however, in mass production, the tensile strength may be decreased in some cases due to the variation in manufacturing conditions and the like. Hence, for electrode foils formed by mass production, it is necessary to add the measurement of tensile strength as an inspection item and to determine a permissible range of the tensile strength.

It is preferable that both of the electrostatic capacitance and the strength of the electrode foil manufactured by the embodiment are improved. Accordingly, the strength of the electrode foil manufactured by the embodiment is preferably approximately equal to or more than that of the electrode foil which is manufactured by an etching treatment and has the same thickness as that of the electrode foil manufactured by the embodiment. Accordingly, as an acceptance criterion for the inspection of the tensile strength, for the electrode foil manufactured in accordance with this embodiment, a tensile strength of 1.5 kg/cm, which was obtained in the above comparative example, is set. This acceptance criterion is commonly applied to the electrode foils manufactured in accordance with the following embodiments 2 to 5.

(v) Conclusion

As described above, in this embodiment, the electrode foil is manufactured by a first and a second steps. The first step includes; fine particle groups (powder) composed of a first valve metal (aluminum) coated with a resin (acrylic resin) is formed into an aerosol in vacuum (Step S10), then the fine particle groups (powder) formed into an aerosol are jetted to a metal foil (aluminum foil 34) in vacuum (Step S12), thus the aerosol deposition layer 56 composed of the fine particle groups tightly adhered to each other is tightly fixed to the above metal foil (aluminum foil 34). The second step includes; the resin is selectively removed from the aerosol deposition layer 56 to form the valve metal layer 30.

Figure 24:
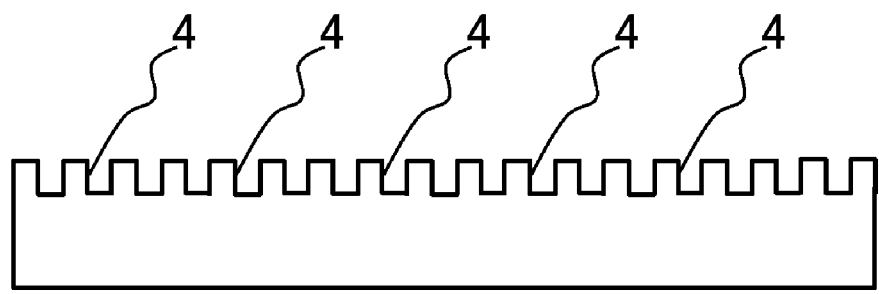
FIG. 24 illustrates a schematic view illustrating a cross-section of an anode foil of an aluminum electrolytic capacitor.
Figure 25:
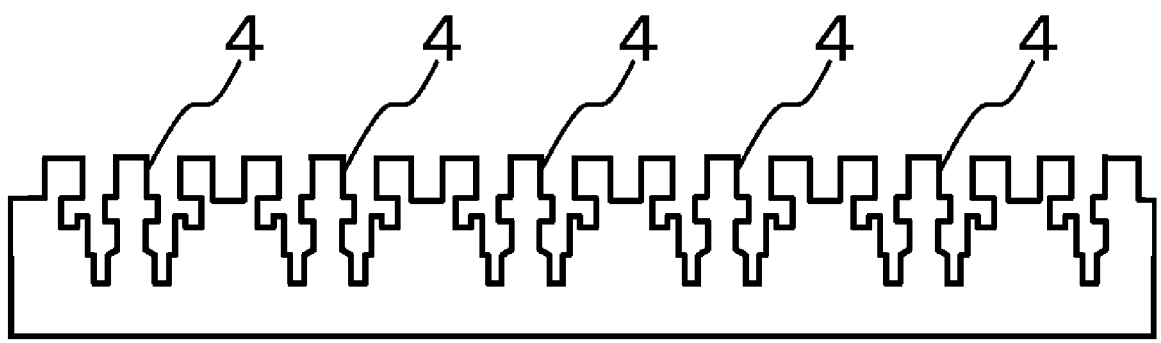
FIG. 25 illustrates a schematic view showing a cross-section of the aluminum foil processed by an intensive etching treatment.

In addition, according to this embodiment, the fine voids 28 formed by selectively removing the resin (acrylic resin) from the aerosol deposition layer are densely and uniformly formed in the valve metal layer 30. Accordingly, the surface area of the electrode foil 24 (see FIG. 3) composed of the valve metal layer 30 and the metal foil 32 is significantly increased as compared to that of a conventional aluminum electrode foil (see FIG. 24) in which only the etching pits 4 are formed by an etching treatment.

Furthermore, according to this embodiment, since it is not necessary to perform intensive etching on an aluminum foil in order to increase the capacitance, the aluminum foil is not embrittled. In addition, the strength is enhanced by the strong valve metal layer 30 formed by the aerosol deposition. Accordingly, the electrode foil manufactured in accordance with this embodiment is strong as compared to an electrode foil formed by etching an aluminum foil having the same thickness as that of the above electrode foil.

That is, according to this embodiment, a metal foil (anode foil) for electrolytic capacitor use can be manufactured which increases the strength while the thickness is maintained approximately equivalent to that of a conventional electrode foil and which also significantly increases the surface area per unit area of the electrode foil.

Accordingly, by using the electrode foil manufactured in accordance with this embodiment, even when the thickness of the electrode foil is decreased, a strength approximately equivalent to a conventional one can be maintained, and the capacitance per unit area can be significantly increased; hence, an electrolytic capacitor having a small size and a large capacitance can be realized compared to a conventional electrolytic capacitor.

Embodiment 2

This embodiment relates to a method for manufacturing an electrode foil (anode foil) for electrolytic capacitor use, in which fine particles composed of a valve metal, such as aluminum, coated with a resin such as acrylic resin are formed into an aerosol. The fine particles thus formed into an aerosol are jetted to an aluminum foil processed by an etching treatment (surface roughing treatment).

(i) Overall Structure

The structure of a winding type electrolytic capacitor in which the electrode foil according to this embodiment is applied as an anode foil is approximately equivalent to that of the winding type electrolytic capacitor of the embodiment 1 (see FIGS. 1 and 2). Hence, a description thereof is omitted.

(ii) Structure of Electrode Foil

Figure 9:
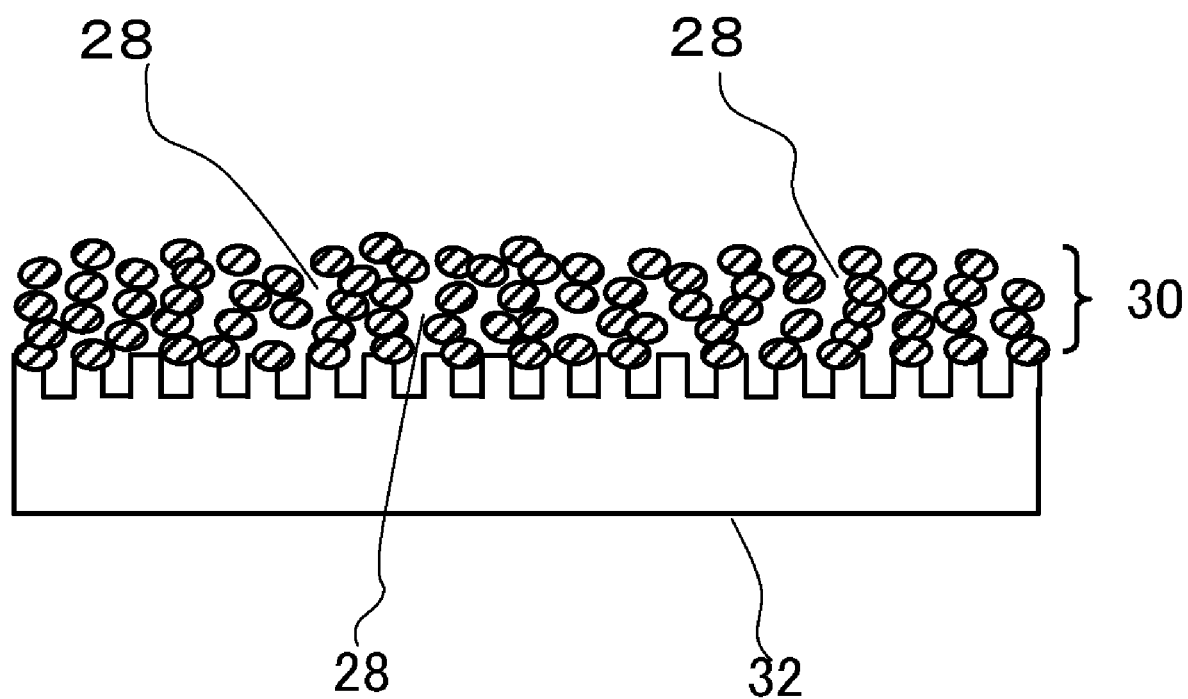
FIG. 9 illustrates a cross sectional view of a electrode foil (anode foil) manufactured according to the second embodiment.

The structure of an electrode foil 68 (anode foil) manufactured in accordance with this embodiment is also approximately equivalent to that of the electrode foil of the embodiment 1. However, the difference from the electrode foil of the embodiment 1 is that the metal foil 32 to which the valve metal layer 30 is tightly fixed is an etched aluminum foil. The etched aluminum foil is processed beforehand by an etching treatment (surface roughing treatment) (see FIG. 9). In addition, FIG. 9 is a view illustrating a cross-sectional structure of the metal foil (anode foil) manufactured in accordance with this embodiment.

(iii) Manufacturing Method

The method for manufacturing an electrode foil of this embodiment is approximately equivalent to the method for manufacturing an electrode foil of the embodiment 1 except for the following points.

That is, according to the manufacturing method of this embodiment, an aluminum foil (etched aluminum foil 66) processed beforehand by an etching treatment (surface roughing treatment) is used instead of a non-processed aluminum foil. Then fine particles are jetted to the metal foil 32. This point is different from the manufacturing method of the embodiment 1. In addition, the etching treatment (Step S16) is not performed on the metal foil after the aerosol deposition, and this point is also different from the manufacturing method of the embodiment 1.

Figure 10:
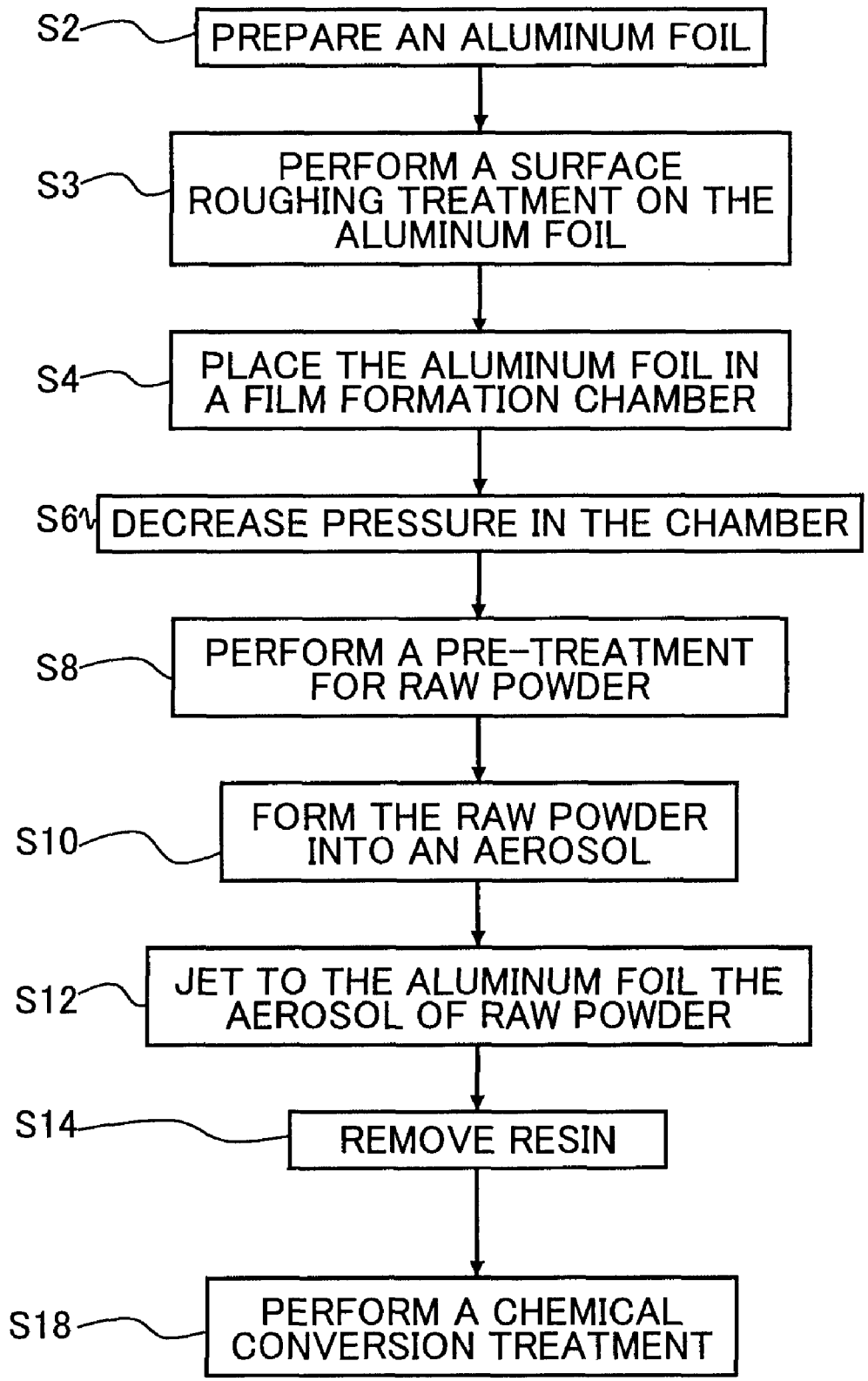
FIG. 10 illustrates a flowchart showing a procedure of the method for manufacturing an electrode foil of the second embodiment.

FIG. 10 is a flowchart illustrating a procedure of the method for manufacturing an electrode foil of this embodiment.

First, an aluminum foil (thickness: 40 µm) having a purity of 99% formed by a rolling method is prepared (Step S2).

Figure 11A:
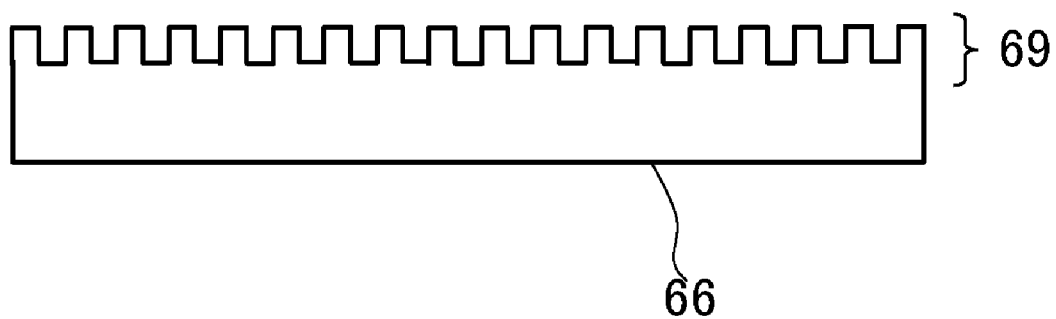
FIGS. 11A and 11B illustrate processing steps according to the second embodiment.

Next, this aluminum foil is annealed at 300° C. in an inert gas as a pre-treatment. Subsequently, this foil is processed by an electrolytic treatment in a mixed aqueous solution containing hydrochloric acid, nitric acid, and $AlCl_3$ at a current density of 0.2 A/m² (50 Hz) for 8 minutes, so that a surface roughing treatment is performed. As a result, as shown in FIG. 11A, the aluminum foil (etched aluminum foil 66) having an etched surface 69 is obtained (Step S3).

Next, as the process flow shown in FIG. 4 described in the embodiment 1, a process from Step S4 to Step S18 is performed on the surface-roughened aluminum foil (etched aluminum foil 66). However, the process is performed without performing the etching treatment of Step S16 shown in FIG. 4.

Figure 11B:
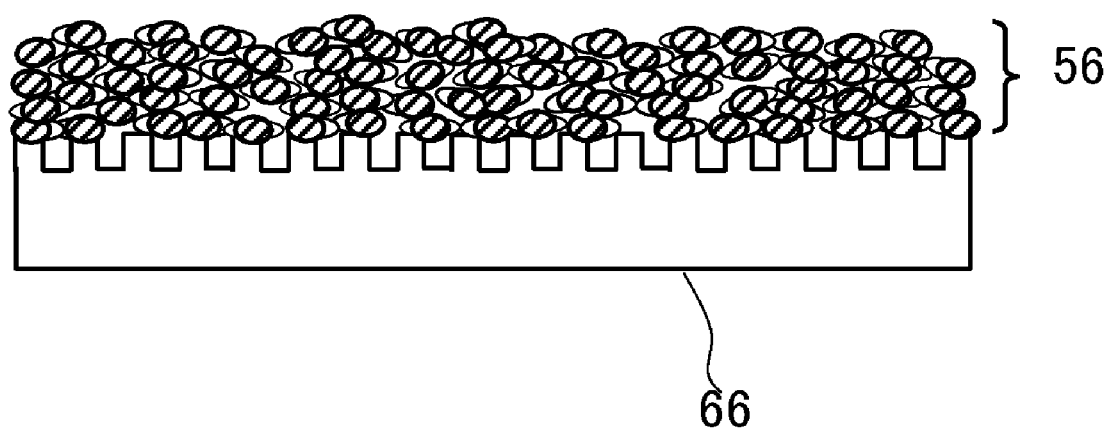
Figure 12:
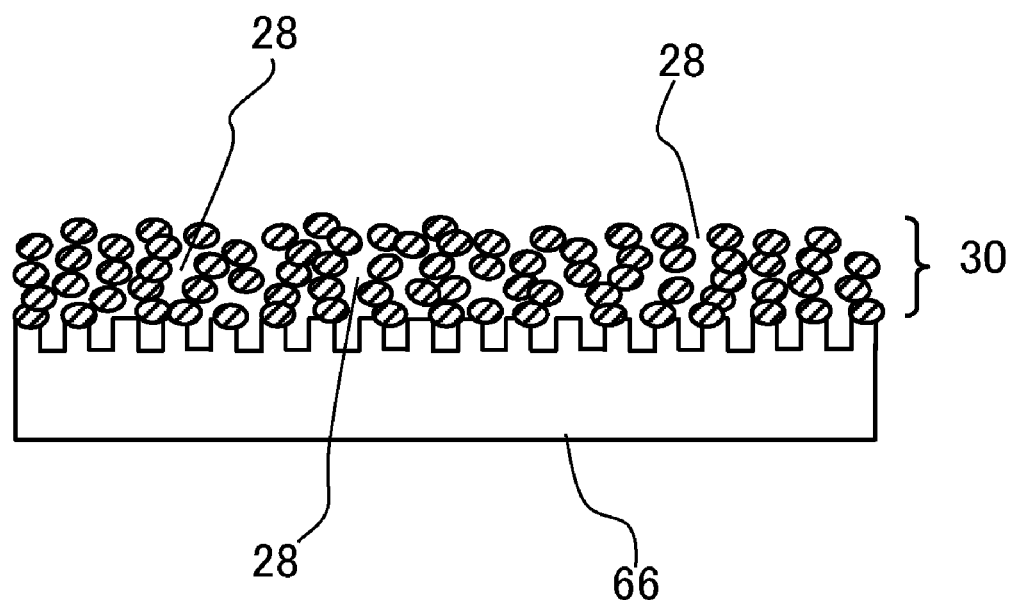
FIG. 12 illustrates a processing step according to the second embodiment.

In this embodiment, FIG. 11B is a cross-sectional view illustrating the state in which an aerosol deposition layer 56 having a thickness of 20 µm is formed on the upper surface of the etched aluminum foil 66. The aerosol deposition layer 56 is formed by jetting an aerosol composed of aluminum fine particles coated with an acrylic resin to the etched aluminum foil 66 (Step S12). In addition, FIG. 12A shows a cross-sectional view illustrating the state in which the fine voids 28 are formed between the aluminum fine particles by selectively removing the acrylic resin coating from the aerosol deposition layer 56 using acetone (Step S14).

By the procedure as described above, the valve metal layer 30 may be formed on two surfaces of the etched aluminum foil 66.

(iv) Characteristics

The tensile strength, leak current (leak current through the dielectric oxide film layer formed by the chemical conversion treatment in Step S18), and electrostatic capacitance per unit area of the electrode foil 68 formed by the process flow shown in FIG. 10 were measured as in the embodiment 1. The measurement conditions and the like were the same as those in the embodiment 1.

As the measurement results, the tensile strength was 1.9 kg/cm, the leak current was 1.1 µA/cm², and the electrostatic capacitance was 250 µF/cm². On the other hand, as the measurement values of the electrode foil manufactured by a conventional etching method, the tensile strength was 1.5 kg/cm, the leak current was 1.0 µA/cm², and the electrostatic capacitance was 40 µF/cm², as described in the embodiment 1 (see Table 1 shown below).

As shown by the measurement results, compared to the electrode foil manufactured by a conventional etching method, the strength of the electrode foil 68 manufactured in accordance with this embodiment is increased by approximately 1.3 times in tensile strength, the leak current is approximately equivalent, and the electrostatic capacitance is increased by approximately 6 times.

That is, according to this embodiment, compared to the electrode foil formed by a conventional etching method, the electrostatic capacitance per unit area is significantly increased and further the mechanical strength is also increased. It is believed that those described above are obtained due to a significant increase in the surface area of the electrode foil by the fine voids 28 which are formed in the valve metal layer 30 and due to strength reinforcement by the strong valve metal layer 30.

Embodiment 3

This embodiment relates to a method for manufacturing an electrode foil (anode foil) for electrolytic capacitor use. In the method, a mixture of first fine particles composed of a valve metal such as aluminum and second fine particles composed of a resin, such as acrylic resin, is formed into an aerosol, and fine particles thus formed into an aerosol are jetted to a metal foil (aluminum foil).

(i) Overall Structure

The structure of a winding type electrolytic capacitor in which the electrode foil according to this embodiment is applied as an anode foil is approximately equivalent to that of the winding type electrolytic capacitor of the embodiment 1 (see FIGS. 1 and 2). Hence, a description thereof is omitted.

(ii) Structure of Electrode Foil

Figure 13:
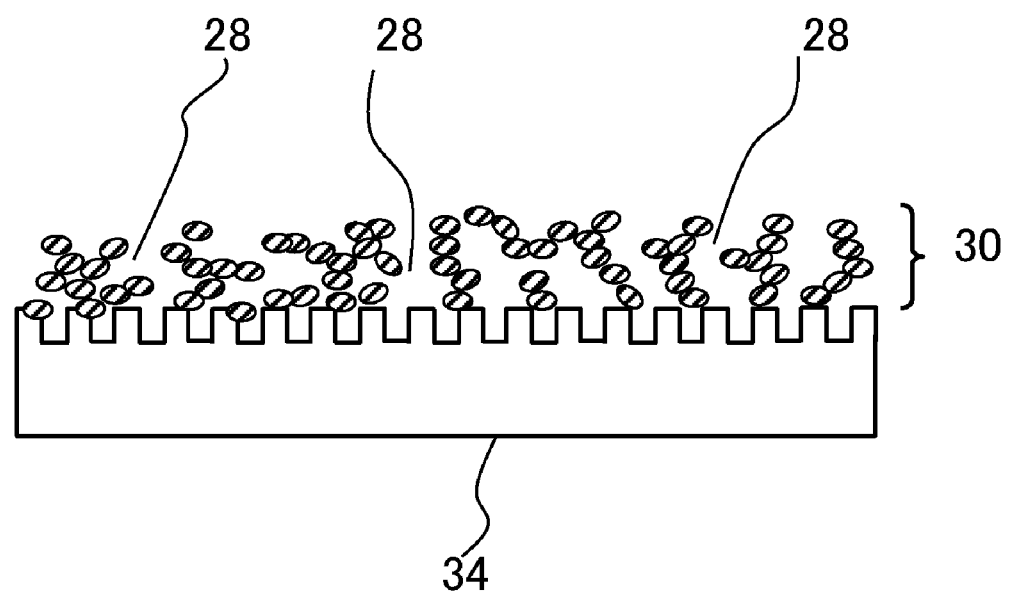
FIG. 13 illustrates a cross sectional view of the electrode foil (an anode foil) manufactured according to the third embodiment.

The structure of the electrode foil (anode foil) manufactured in accordance with this embodiment is approximately equivalent to that of the electrode foil of the embodiment 1. However, the difference from the electrode foil of the embodiment 1 is that the fine voids 28 formed in a valve metal layer 23 are derived from spaces formed after the second fine particles composed of the resin (acrylic resin) are removed (see FIG. 13). In addition, FIG. 13 is a view illustrating a cross-sectional structure of the metal foil (anode foil) manufactured in accordance with this embodiment.

(iii) Manufacturing Method

The method for manufacturing an electrode foil of this embodiment is approximately equivalent to the method for manufacturing an electrode foil of the embodiment 1 except for the following points.

That is, according to the manufacturing method of this embodiment, the fine particles in a state of an aerosol and to be jetted to the metal foil 32 are the mixture of the first fine particles composed of aluminum (valve metal) and the second fine particles composed of an acrylic resin (resin) instead of the aluminum fine particles coated with an acrylic resin. This point is different from the manufacturing method of the embodiment 1.

A process flow of this embodiment is the same as the process flow described in the previous embodiment 1 with reference to FIG. 4. However, as described above, the composition of the "starting material powder" is different from that in the embodiment 1.

First, from the preparation of an aluminum foil to the evacuation of the film formation chamber, as in the embodiment 1, a process from Step S2 to Step S6 described in the previous embodiment 1 with reference to FIG. 4 is performed.

Next, a mixture of aluminum fine particles (average particle diameter: 3 μm) and fine particles (average particle diameter: 50 μm) composed of an acrylic resin is charged as the starting material powder 46 in the aerosol generation container 48 of the aerosol deposition apparatus shown in FIG. 7. Then the aerosol generation container 48 is evacuated for 30 minutes while the whole aerosol generation container 48 is exposed to ultrasonic waves generated by the vibrator 50 and heating is performed at a temperature of approximately 150° C., so that a pre-treatment for removing moisture adsorbed on powder surfaces is performed (Step S8).

Next, as the process flow described in the previous embodiment 1 with reference to FIG. 4, a process from Step S10 to Step S18 is performed.

Figure 14:
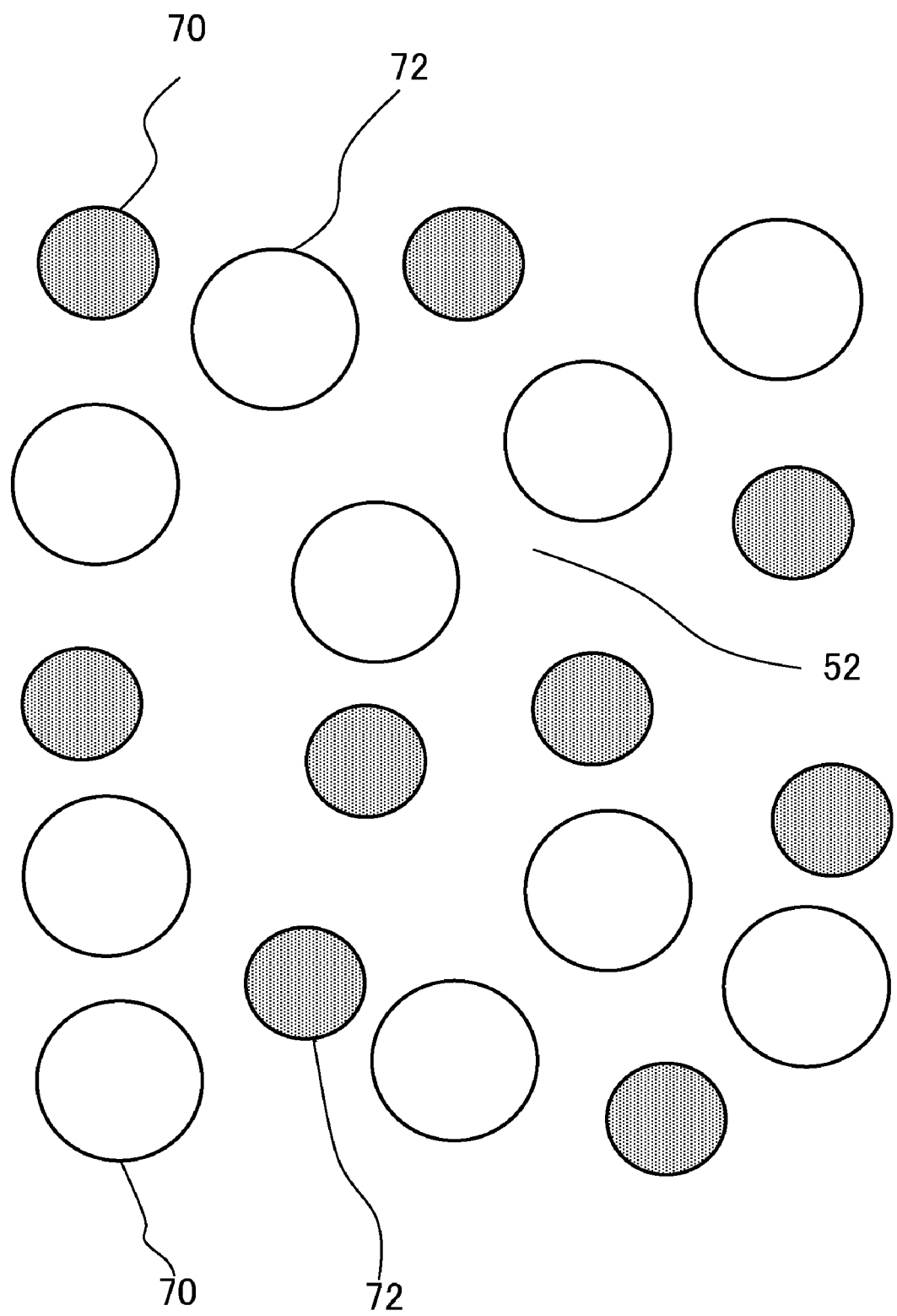
FIG. 14 illustrates a schematic view showing the state of aerosolized mixture of the aluminum fine particles and fine particles composed of an acrylic resin.

FIG. 14 is a schematic view illustrating the state of the starting material powder which is formed into an aerosol in Step S10. As shown in FIG. 14, aluminum fine particles 70 and fine particles 72 composed of an acrylic resin are floating in the helium gas 52 introduced in the aerosol generation container 48, so that an aerosol state is formed.

FIGS. 15A, 15B, 16A, and 16B are views illustrating the states of process steps of this embodiment.

Figure 15A:
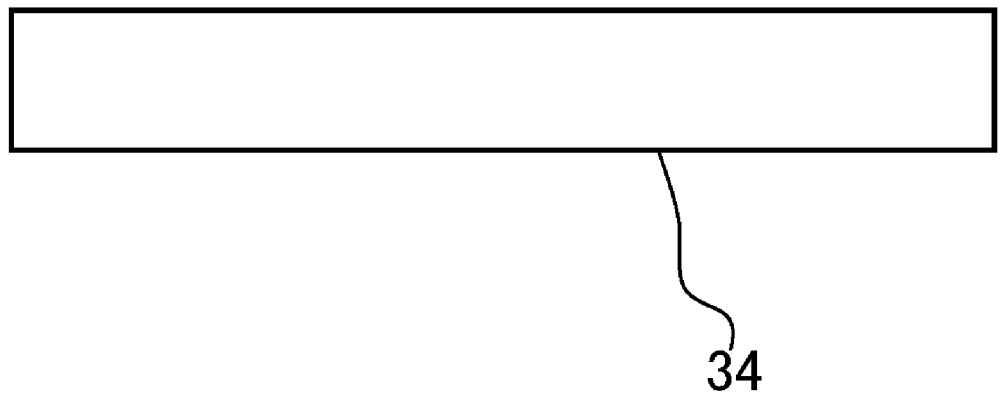
FIGS. 15A and 15B illustrate processing steps according to the third embodiment.
Figure 15B:
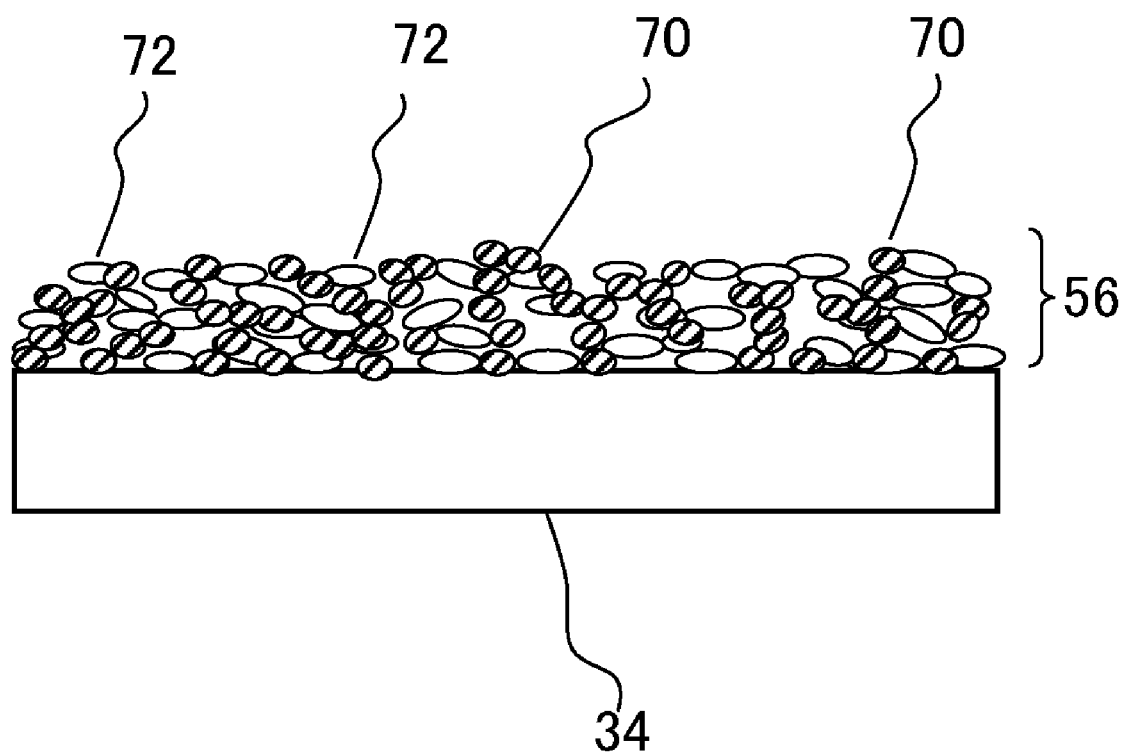

FIG. 15A is a view illustrating the state of the aluminum foil 34 prepared in Step S2. FIG. 15B is a view illustrating the state in which an aerosol deposition layer 56 having a thickness of 20 μm is formed on the upper surface of the aluminum foil 34. The aerosol deposition layer 56 is formed by jetting an mixture to the aluminum foil 34 (Step S12), where the mixture is an aerosolized mixture of the aluminum fine particles 70 and the fine particles 72 composed of an acrylic resin.

Figure 16A:
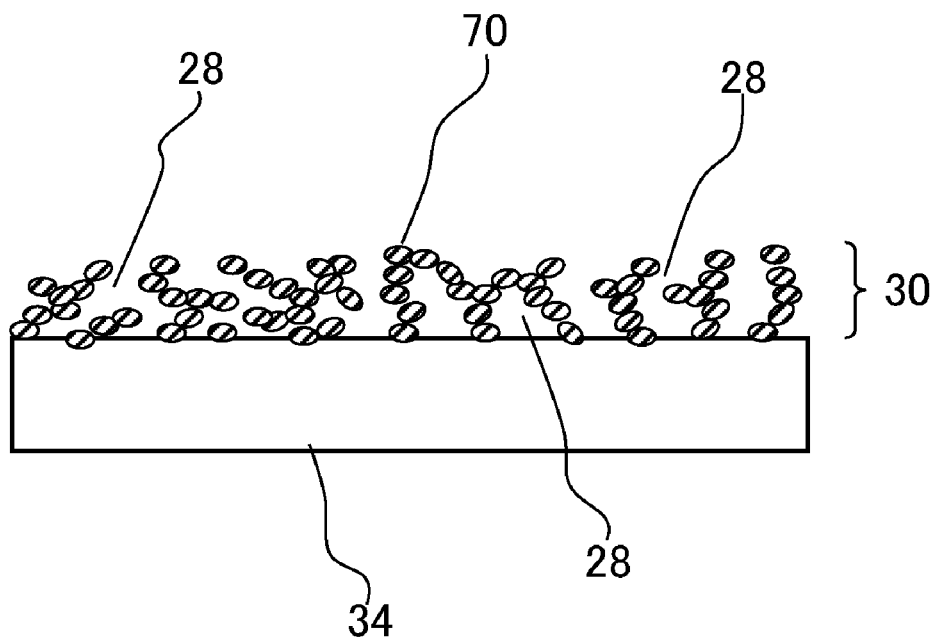
FIGS. 16A and 16B illustrate processing steps according to the third embodiment.

In addition, FIG. 16A is a view illustrating the state in which the fine voids 28 are formed between the aluminum fine particles 70 by selectively removing the fine particles 72 composed of an acrylic resin from the aerosol deposition layer 56 using acetone (Step S14).

Figure 16B:
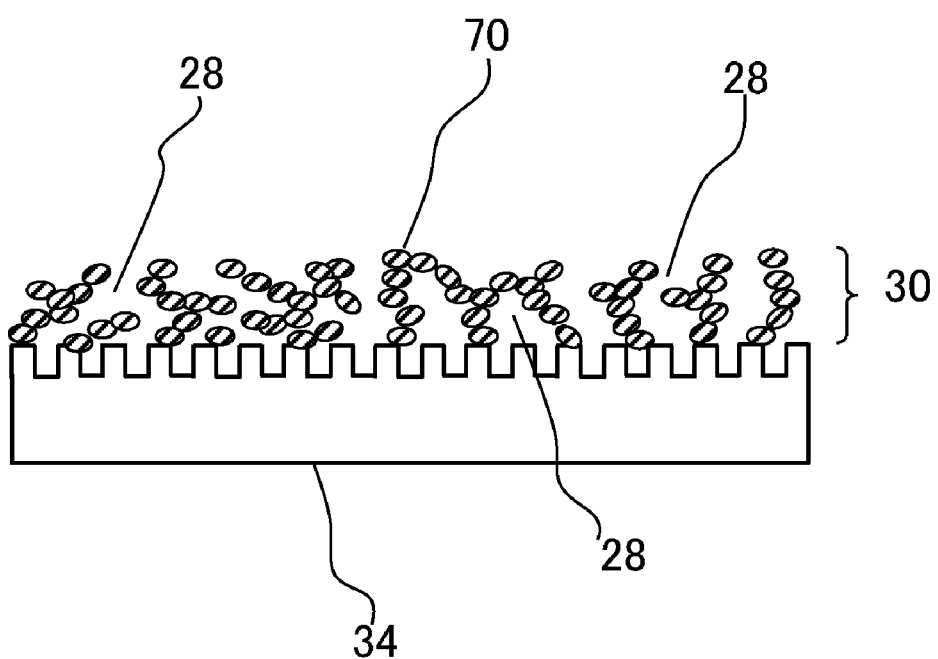

Furthermore, FIG. 16B is a view illustrating the state in which the surface area is increased by performing an etching treatment (Step S16) on the valve metal layer 30 formed in Step S14 and the aluminum foil 34.

(iv) Characteristics

The tensile strength, leak current (leak current through the dielectric oxide film layer formed by the chemical conversion treatment in Step S18), and electrostatic capacitance per unit area of an electrode foil 74 formed in this embodiment were measured as in the embodiment 1. The measurement conditions and the like were the same as those in the embodiment 1.

As the measurement results, the tensile strength was 1.9 kg/cm, the leak current was 3.4 μA/cm$^2$, and the electrostatic capacitance was 280 μF/cm$^2$. On the other hand, as the measurement values of the electrode foil manufactured by a conventional etching method, the tensile strength was 1.5 kg/cm, the leak current was 1.0 μA/cm$^2$, and the electrostatic capacitance was 40 μF/cm$^2$, as described in the embodiment 1 (see Table 1 shown below).

As shown by the measurement results, compared to the electrode foil manufactured by a conventional etching method, the strength of the electrode foil 74 manufactured in accordance with this embodiment is increased by approximately 1.3 times in tensile strength, the leak current is approximately equivalent, and the electrostatic capacitance is increased by approximately 7 times.

That is, according to this embodiment, compared to the electrode foil formed by a conventional etching method, the electrostatic capacitance per unit area is significantly increased and further the mechanical strength is also increased. It is believed that those described above are obtained due to a significant increase in the surface area of the electrode foil by the fine voids 28 which are densely and uniformly formed in the valve metal layer 30 and due to strength reinforcement by the strong valve metal layer 30.

(v) Conclusion

As described above, the method for manufacturing an electrode foil of this embodiment includes a first step and a second step. In the first step, a mixture of first fine particle groups (powder) composed of a first valve metal (aluminum) and second fine particle groups composed of a resin (acrylic resin) is formed into an aerosol (see FIG. 14). Then the mixture formed into an aerosol is jetted to the metal foil 34 in vacuum (Step S 12) so that the aerosol deposition layer 56 composed of fine particles of the mixture tightly adhered to each other is tightly fixed to the metal foil 32 (aluminum foil 34). In the second step, the above resin (acrylic resin) is selectively removed from the aerosol deposition layer 56 to form the valve metal layer 30 (see FIG. 16A).

In addition, by the steps as described above, since the valve metal layer 30 in which the fine voids 28 are densely and uniformly present is formed by removing the acrylic resin from the aerosol deposition layer 56, the electrostatic capacitance per unit area is significantly increased. In addition, since the reinforcement is performed by the strong valve metal layer 30 formed by the aerosol deposition, the electrode foil of this embodiment is improved in mechanical strength as compared to a conventional electrode foil formed by an etching treatment and having the same thickness as that of the foil of this embodiment.

Embodiment 4

This embodiment relates to a method for manufacturing an electrode foil (anode foil) for electrolytic capacitor use. In the method, a mixture of first fine particles composed of a valve metal, such as aluminum, coated with a first resin such as acrylic resin and second fine particles composed of a ceramic, such as barium titanate, coated with a second resin such as butyral resin is formed into an aerosol. Then fine particles thus formed into an aerosol are jetted to an aluminum foil (etched aluminum foil 66) processed by an etching treatment (surface roughing treatment).

(i) Overall Structure

The structure of a winding type electrolytic capacitor in which the electrode foil according to this embodiment is applied as an anode foil is approximately equivalent to that of the winding type electrolytic capacitor of the embodiment 1 (see FIGS. 1 and 2). Hence, a description thereof is omitted.

(ii) Structure of Electrode Foil

Figure 17:
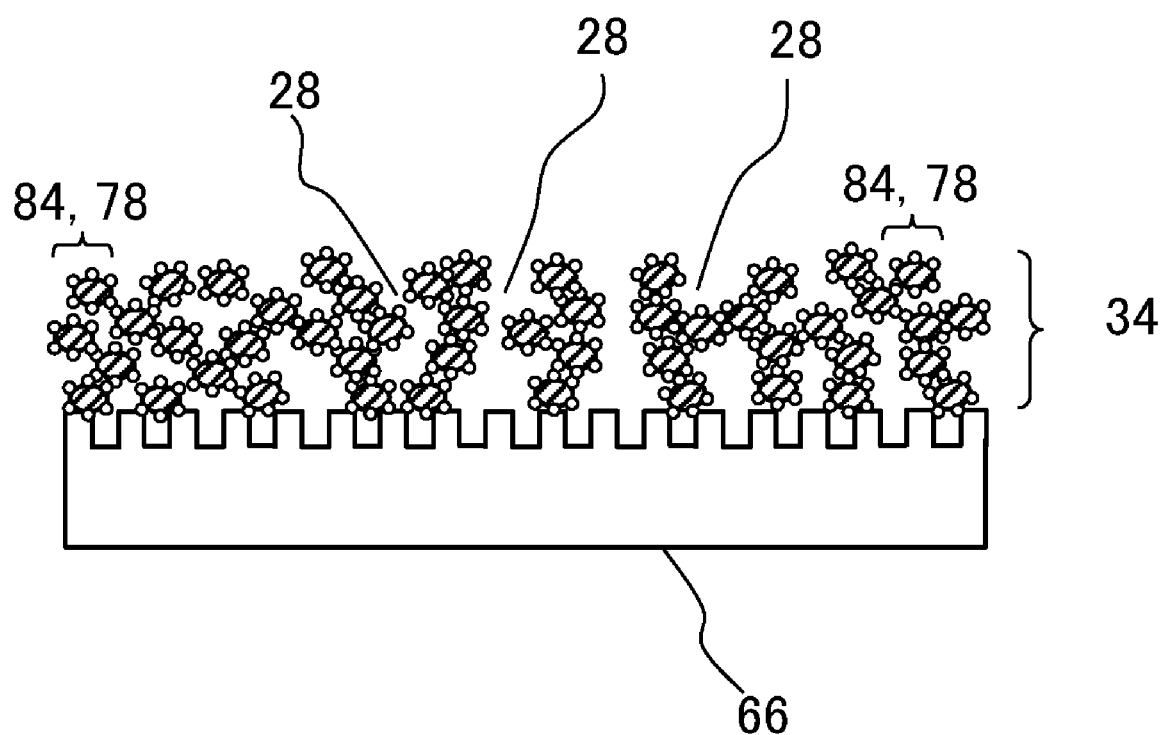
FIG. 17 illustrates a cross sectional view of a electrode foil (anode foil) manufactured according to the fourth embodiment.

As shown in FIG. 17, the structure of an electrode foil 76 (anode foil) manufactured in accordance with this embodiment is approximately equivalent to that of the electrode foil of the embodiment 2 except for the following points.

That is, the electrode foil 76 of this embodiment has a dielectric constant larger than that of the electrode foil 68 of the embodiment 2. The difference is caused by the electrode foil 76 having ceramic fine particles 78 composed of barium titanate incorporated with an oxide film (not shown) which obtained by performing a chemical conversion treatment on the valve metal layer 30 and the etched aluminum foil 66 (see FIG. 17).

(iii) Manufacturing Method

The method for manufacturing the electrode foil 76 of this embodiment is approximately equivalent to the method for manufacturing the electrode foil 68 of the embodiment 2 in which the etched aluminum foil is used as the substrate except for the following points.

That is, the starting material powder is composed of a first and a second fine particles. The first fine particles are composed of aluminum having an average particle diameter of approximately 3 μm coated with an acrylic resin and the second fine particles are composed of barium titanate (BaTiO3; relative dielectric constant: 200) having an average particle diameter of approximately 100 nm coated with a butyral resin. Then the starting material powder is formed into an aerosol. The starting material powder aerosolized is jetted to the etched aluminum foil 66. In addition, the thickness of the coating layer composed of an acrylic resin is preferably 100 nm to 1 μm, and, the thickness of the coating layer composed of a butyral resin is preferably 100 nm to 1,000 nm.

Figure 18:
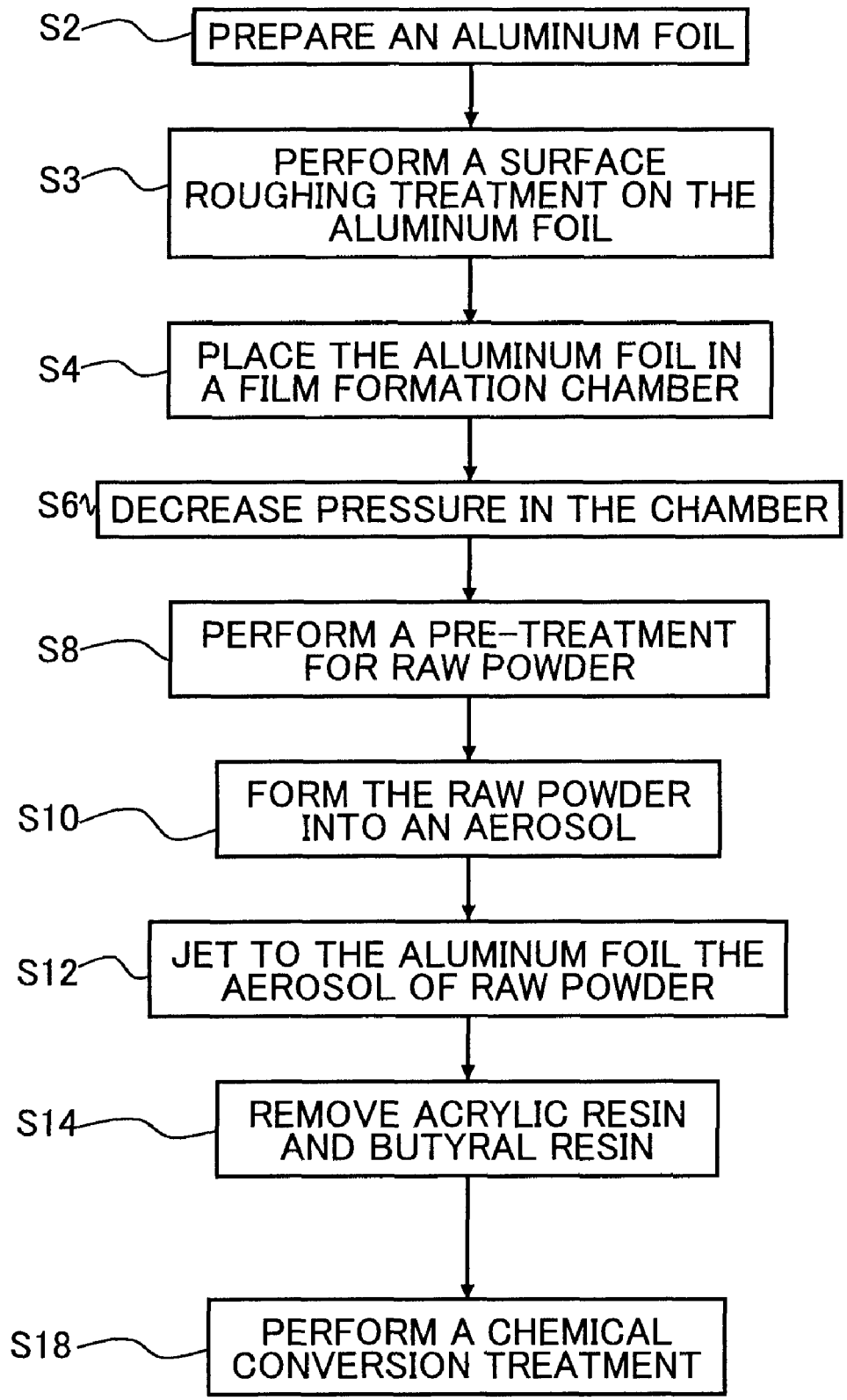
FIG. 18 illustrates a flowchart showing a procedure of the method for manufacturing an electrode foil of the fourth embodiment.

FIG. 18 is a flowchart of the method for manufacturing an electrode foil of this embodiment.

In this embodiment, from the preparation of the aluminum foil to the evacuation of the film formation chamber, as the flow described in the previous embodiment 2 with reference to FIG. 10, a process from Step S2 to Step S6 is performed.

Next, a mixture of aluminum fine particles coated with an acrylic resin and fine particles composed of barium titanate (BaTiO3) coated with a butyral resin is charged as the starting material powder 46 in the aerosol generation container 48 of the aerosol deposition apparatus shown in FIG. 7. Then the aerosol generation container 48 is evacuated for 30 minutes while the whole aerosol generation container 48 is exposed to ultrasonic waves generated by the vibrator 50 and heating is performed at a temperature of approximately 150° C., so that a pre-treatment for removing moisture adsorbed on powder surfaces is performed (Step S8).

Subsequently, as the process flow described in the previous embodiment 2 with reference to FIG. 10, a process from Step S10 to Step S12 is performed.

Next, the aluminum foil provided with an aerosol deposition layer formed thereon is immersed in a mixed solution of acetone and ethanol and is then processed by ultrasonic wave application, so that the acrylic resin and the butyral resin are removed from the aerosol deposition layer (Step S14).

Subsequently, as the flow process described in the previous embodiment 2 with reference to FIG. 10, a process of Step S18 is performed.

Figure 19:
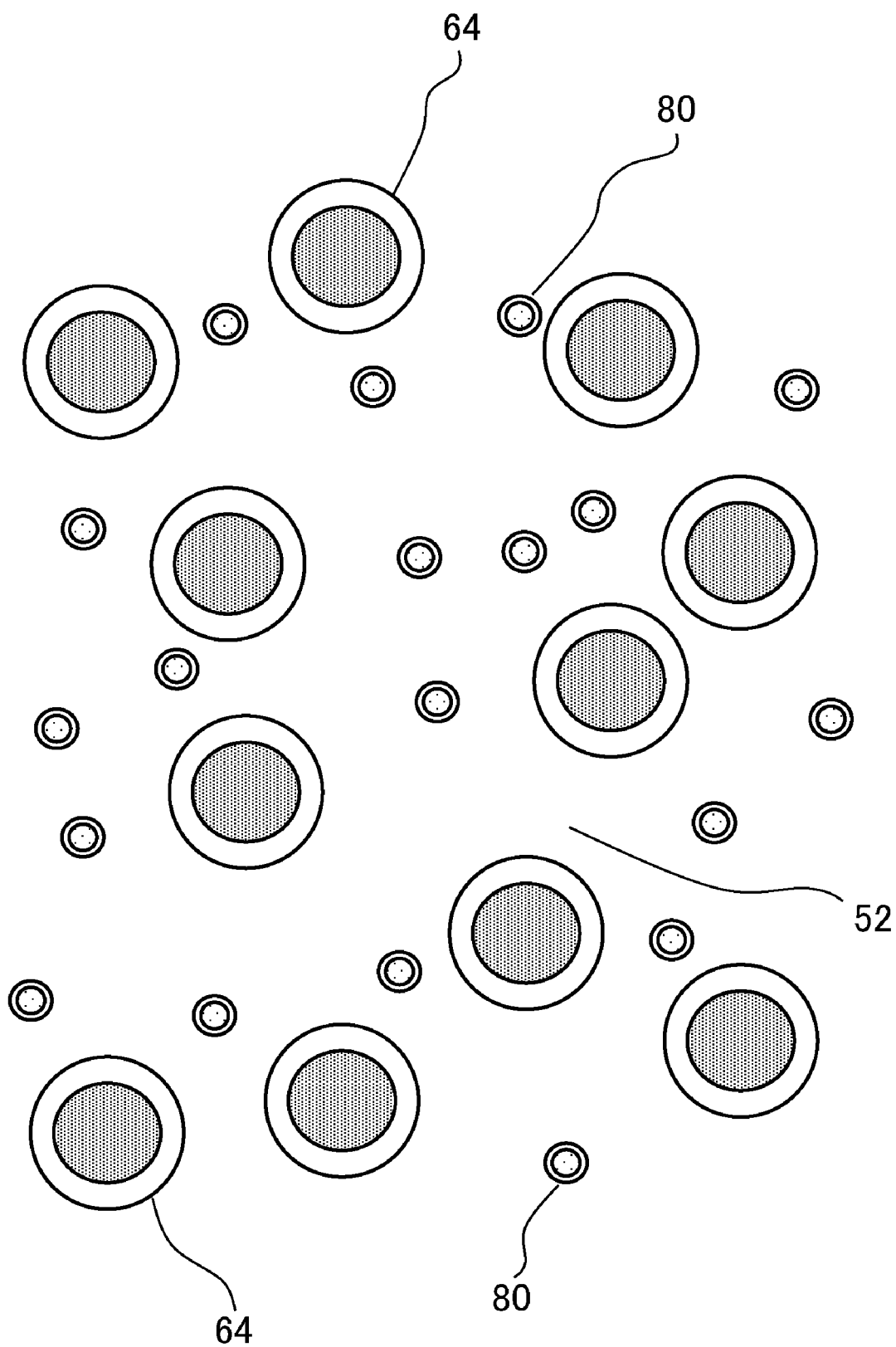
FIG. 19 illustrates a schematic view showing the state of the aerosolized mixture the aluminum fine particles coated with an acrylic resin and fine particles composed of barium titanate coated with a butyral resin.

FIG. 19 is a schematic view illustrating the state of the starting material powder which is formed into an aerosol in Step 10. As shown in FIG. 19, the aluminum fine particles 64 coated with an acrylic resin and fine particles 80 composed of barium titanate (BaTiO$_3$) coated with a butyral resin are floating in the helium gas 52 introduced in the aerosol generation container 48, so that an aerosol state is formed.

Figure 20A:
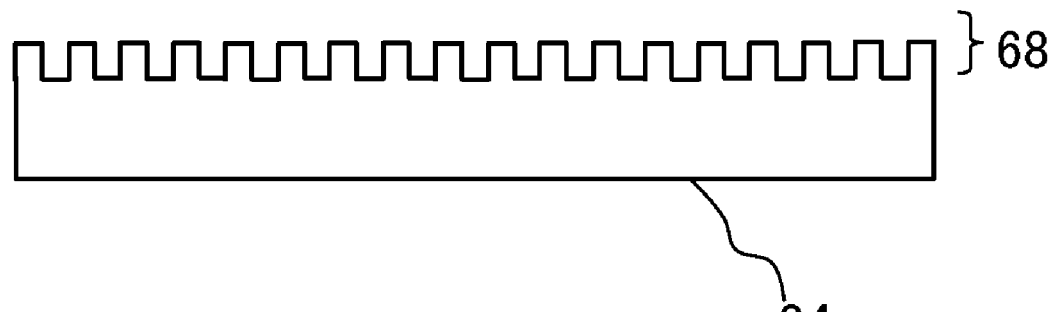
FIGS. 20A and 20B illustrate processing steps according to the fourth embodiment.
Figure 20B:
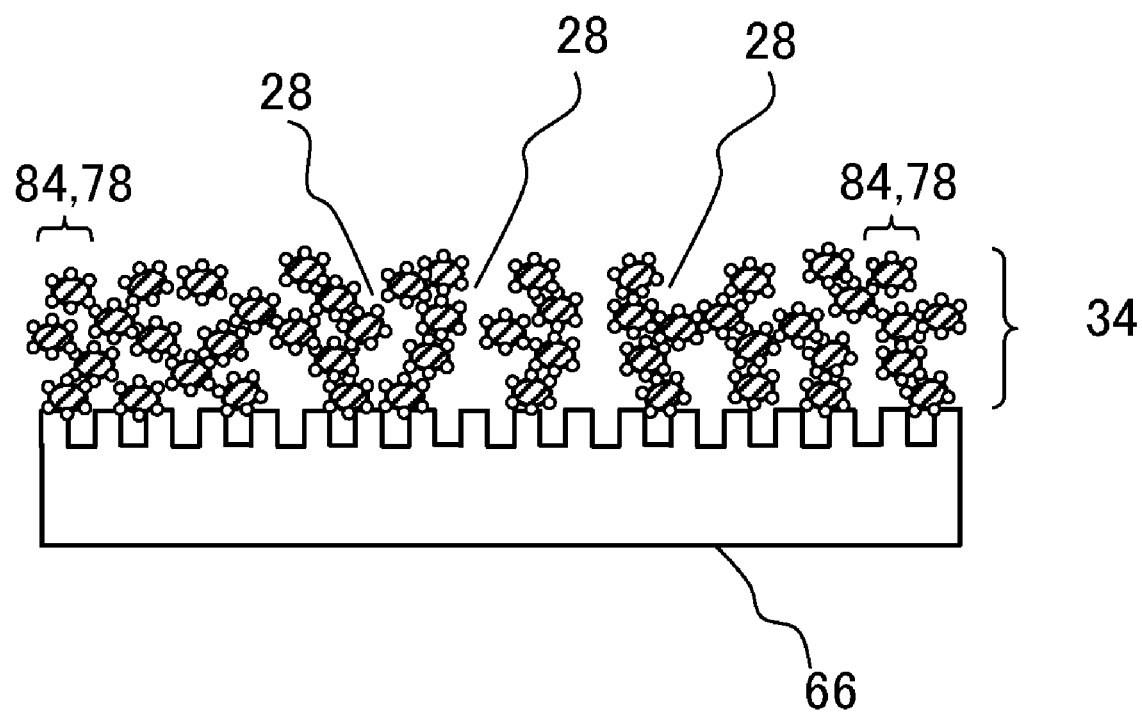

FIGS. 20A and 20B show views each illustrating the state of a process step of this embodiment.

FIG. 20A is a view illustrating the state of the aluminum foil 34 which is processed by surface roughing in Step S3. FIG. 20B is a view illustrating the state in which the fine voids 28 are formed between aluminum particles 84 provided with the barium titanate fine particles tightly fixed to the surfaces thereof by selectively removing the acrylic resin and the butyral resin (Step S14) from the aerosol deposition layer using a mixture of acetone and ethanol.

Figure 21:
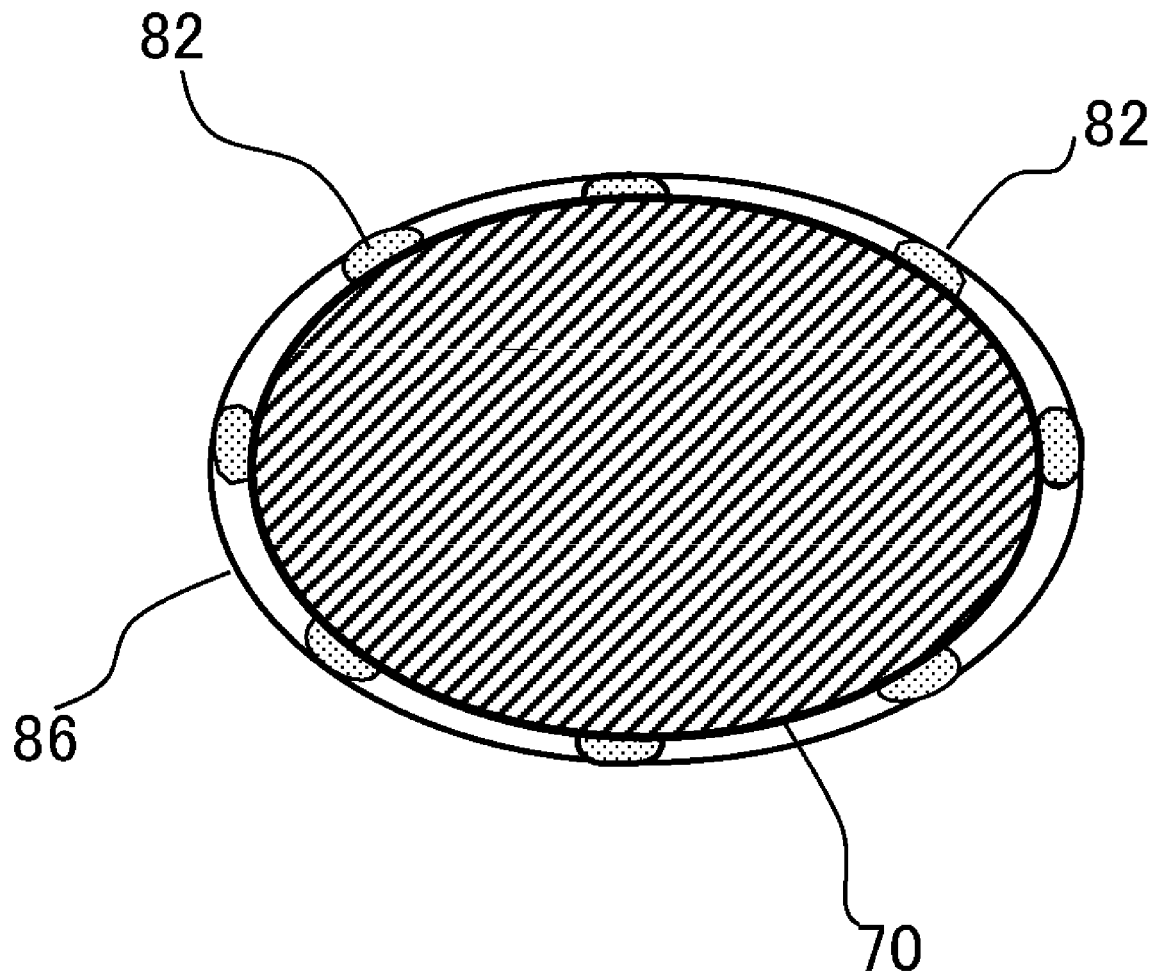
FIG. 21 illustrates a schematic view illustrating a cross-section of aluminum fine particles provided with a dielectric oxide film layer formed on the surface thereof by the chemical conversion treatment and ceramic fine particles adhered to the surface.

FIG. 21 is a schematic view illustrating a cross-section of one aluminum fine particle 70 provided with a dielectric oxide film layer 86 formed on the surface thereof by the chemical conversion treatment (Step S18).

By the chemical conversion treatment, the aluminum oxide film 86 (relative dielectric constant: 7 to 8) is formed on the surface of the aluminum fine particle 70 which is deformed by collision as shown in FIG. 21. In addition, barium titanate fine particles 82 having a high dielectric constant (relative dielectric constant: 200) cover the surface of the aluminum fine particle 70 together with the aluminum oxide film 86 (dielectric oxide film) so as to form part of the dielectric layer. The barium titanate fine particles 82 has a smaller particle diameter than that of the aluminum fine particle 70. In addition, in the aerosol deposition layer, the aluminum fine particle 70 is tightly fixed to other aluminum fine particles 70, however, the other fine particles are not shown in FIG. 21.

The relative dielectric constant of the above ceramic is preferably 10 or more, which is higher than the relative dielectric constant (7 to 8) of the aluminum oxide film, and the diameter of the ceramic fine particles is preferably 500 nm or less.

(iv) Characteristics

The tensile strength, leak current (leak current through the dielectric oxide film layer formed by the chemical conversion treatment in Step S18), and electrostatic capacitance per unit area of the electrode foil 76 formed in this embodiment were measured as in the embodiment 1. The measurement conditions and the like were the same as those in the embodiment 1.

As the measurement results, the tensile strength was 1.9 kg/cm, the leak current was 2.5 $\mu A/cm^2$, and the electrostatic capacitance was 265 $\mu F/cm^2$. On the other hand, as the measurement values of the electrode foil manufactured by a conventional etching method, the tensile strength was 1.5 kg/cm, the leak current was 1.0 $\mu A/cm^2$, and the electrostatic capacitance was 40 $\mu F/cm^2$, as described in the embodiment 1 (see Table 1 shown below).

As shown by the measurement results, as compared to the electrode foil manufactured by a conventional etching method, the strength of the electrode foil 76 manufactured in accordance with this embodiment is increased by approximately 1.3 times in tensile strength, the leak current is approximately equivalent, and the electrostatic capacitance is increased by approximately 7 times.

That is, according to this embodiment, compared to the electrode foil by a conventional etching method, the electrostatic capacitance per unit area is significantly increased and further the mechanical strength is also increased. The increase in electrostatic capacitance is due to a synergetic effect of a significant increase in the surface area of the electrode foil by the fine voids 28 which are densely and uniformly formed in the valve metal layer 30 and an increase in dielectric constant by the dielectric oxide film including barium titanate. In addition, an increase in mechanical strength of the electrode foil 76 is believed due to strength reinforcement by the valve metal layer 30.

(v) Conclusion

As described above, the method for manufacturing an electrode foil of this embodiment includes a first step and a second step. The first step includes a process in which a mixture of a first fine particles group and a second fine particles group is aerosolized, then the aerosolized mixture is jetted against a metal foil (etched aluminum foil 66) in vacuum. Thus an aerosol deposition layer composed of fine particles of the mixture tightly adhered to each other is tightly fixed to the above metal foil (S12). The first fine particles group is composed of the first valve metal (aluminum) coated with a first resin (acrylic resin). The second fine particles group is composed of a ceramic (barium titanate) having a higher dielectric constant than that of an oxide film formed by performing a chemical conversion treatment on the first valve metal (aluminum) and having a particle diameter smaller than that of the first fine particle group. The second step includes a process in which the first and the second resins (acrylic resin and butyral resin) are selectively removed from the aerosol deposition layer to form the valve metal layer 30.

Since removing the acrylic resin and the butyral resin from the aerosol deposition layer in the method for manufacturing an electrode foil of this embodiment, the valve metal layer 30 has the fine voids 28 densely and uniformly formed and the dielectric constant of the dielectric oxide film is increased by the above ceramic (barium titanate). Accordingly, the electrostatic capacitance per unit area is significantly increased.

In addition, since the reinforcement is performed by the strong valve metal layer 30 formed by the aerosol deposition, the electrode foil of this embodiment is improved in mechanical strength as compared to a conventional electrode foil formed by an etching treatment and having the same thickness as that of the foil of this embodiment.

Embodiment 5

This embodiment relates to a method for manufacturing an electrode foil (anode foil) for electrolytic capacitor use. In this embodiment, a starting material powders is composed of two types of fine particles mixed together. Each of two types of fine particles have different average particle diameters. The starting material powders are formed into an aerosol and jetted to an aluminum foil to form an aerosol deposition layer. The aerosol deposition layer and the aluminum foil are processed by a chemical conversion treatment without performing an etching treatment (surface roughing treatment).

(i) Overall Structure

The structure of a winding type electrolytic capacitor in which the electrode foil according to this embodiment is applied as an anode foil is approximately equivalent to that of the winding type electrolytic capacitor of the embodiment 1 (see FIGS. 1 and 2). Hence, a description thereof is omitted.

(ii) Structure of Electrode Foil

Figure 23:
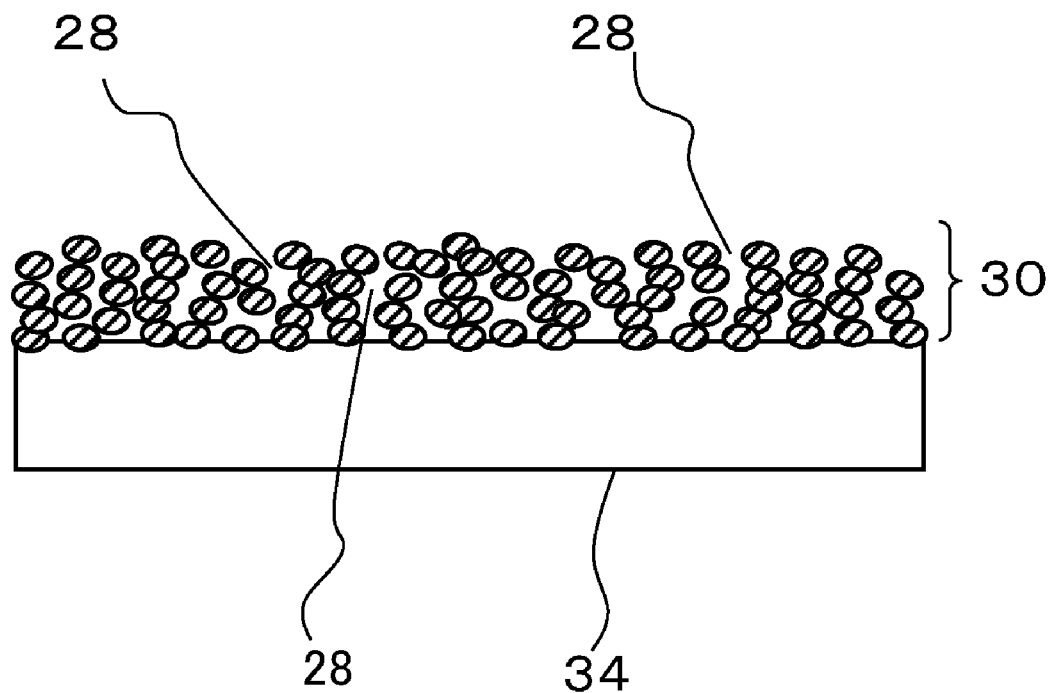
FIG. 23 illustrates a cross sectional view of a electrode foil (anode foil) manufactured according to the fifth embodiment.

The structure of an electrode foil 88 (anode foil) manufactured in accordance with this embodiment is approximately equivalent to that of the electrode foil of the embodiment 1. However, the valve metal layer 30 and the aluminum foil 34 are not processed by an etching treatment, and this is a different point from the electrode foil 24 of the embodiment 1. FIG. 23 is a view illustrating a cross-sectional structure of a metal foil (anode foil) manufactured in accordance with this embodiment.

(iii) Manufacturing Method

The method for manufacturing an electrode foil of this embodiment is approximately equivalent to the method for manufacturing an electrode foil of the embodiment 1 except for the following points.

The difference of the manufacturing method of this embodiment from that of the embodiment 1 is that the starting material powder to be formed into an aerosol is a mixture containing first fine particles composed of aluminum having an average particle diameter of 3 $\mu m$ coated with an acrylic resin and second fine particles composed of aluminum having an average particle diameter of 10 $\mu m$ coated with an acrylic resin at a mixing ratio of 1 to 1. In addition, the difference of the manufacturing method of this embodiment from the manufacturing method of the embodiment 1 is that the etching treatment is not performed on the aerosol deposition layer 30 and the aluminum foil substrate 34.

Figure 22:
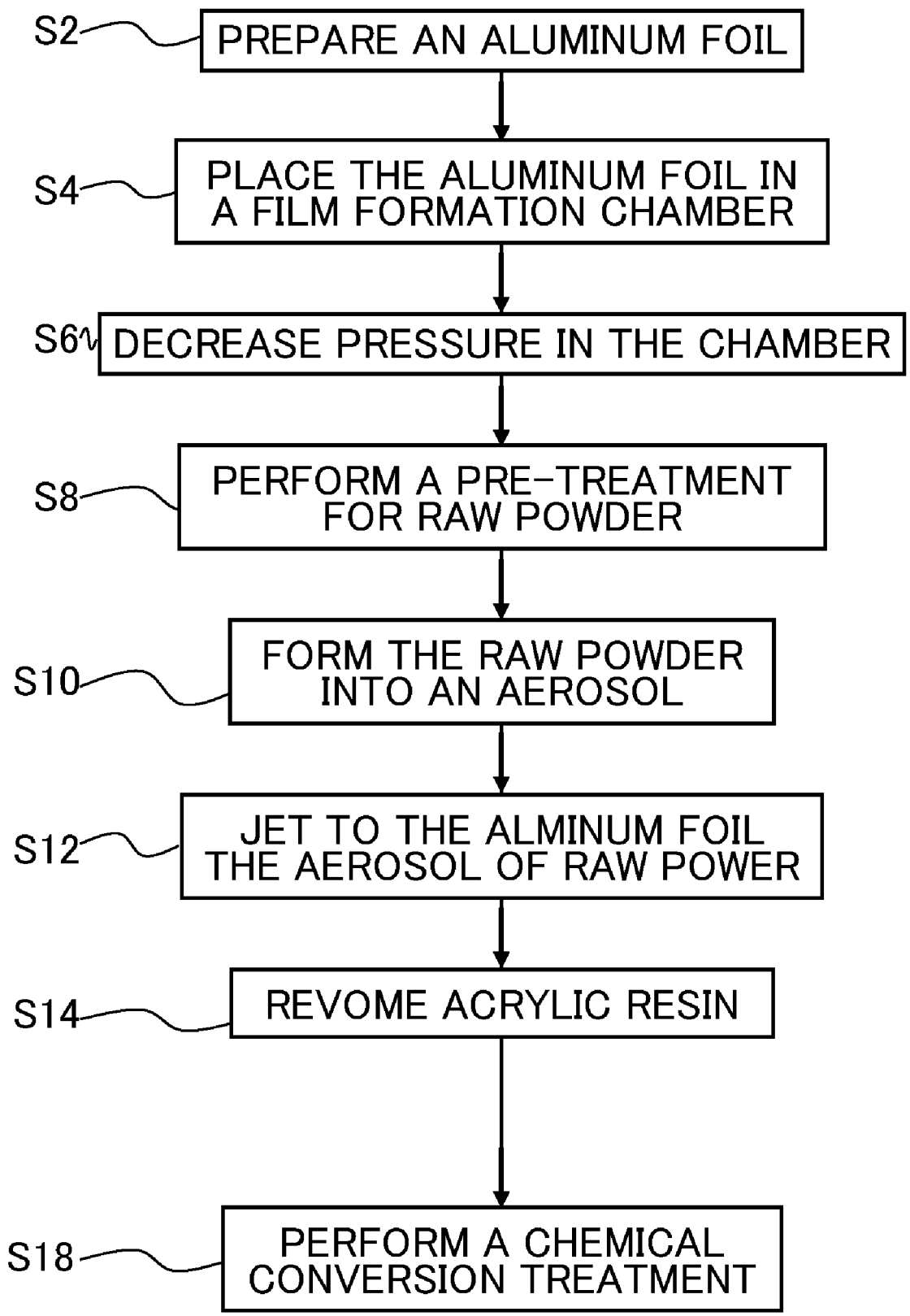
FIG. 22 illustrates a flowchart showing a procedure of the method for manufacturing an electrode foil of the fifth embodiment.

FIG. 22 is a flowchart illustrating a procedure of the method for manufacturing an electrode foil of this embodiment.

As the process flow described in the previous embodiment 1 with reference to FIG. 4, from the preparation of the aluminum foil to the evacuation of the film formation chamber, a process from Step S2 to Step S6 is performed.

Next, after a mixture formed by mixing aluminum fine particles having an average particle diameter of 3 $\mu m$ coated with an acrylic resin and aluminum fine particles having an average particle diameter of 10 $\mu m$ coated with an acrylic resin at a mixing ratio of 1 to 1 is charged as the starting material powder 46 in the aerosol generation container 48 of the aerosol deposition apparatus shown in FIG. 7. Then vacuum deaeration is performed for 30 minutes while ultrasonic waves are applied to the whole aerosol generation container 48 by the vibrator 50 and heating is performed at a temperature of approximately 150° C., so that a pre-treatment for removing moisture adsorbed on powder surfaces is performed (Step S8).

Subsequently, as the process flow described in the previous embodiment 1 with reference to FIG. 4, a process from Step S10 to Step S14 is performed.

Subsequently, without performing an etching treatment, the chemical conversion treatment is performed on the aerosol deposition layer and the aluminum foil substrate (Step S18), so that the electrode foil 88 shown in FIG. 23 is completed.

By the procedure described above, the valve metal layer may be formed on two surfaces of the aluminum foil.

In addition, as the substrate to which the aerosol is applied, besides the aluminum foil, a metal foil composed of another valve metal, such as titanium, tantalum, niobium, an aluminum alloy, a titanium alloy, a tantalum alloy, or a niobium alloy, may also be used.

(iv) Characteristics

The tensile strength, leak current (leak current through the dielectric oxide film layer formed by the chemical conversion treatment in Step S18), and electrostatic capacitance per unit area of the electrode foil 88 formed by the process flow shown in FIG. 22 were measured as in the embodiment 1. The measurement conditions and the like were the same as those in the embodiment 1.

As the measurement results, the tensile strength was 2.5 kg/cm, the leak current was 0.9 µA/cm$^2$, and the electrostatic capacitance was 100 µF/cm$^2$. On the other hand, as the measurement values of the electrode foil manufactured by a conventional etching method, the tensile strength was 1.5 kg/cm, the leak current was 1.0 µA/cm$^2$, and the electrostatic capacitance was 40 µF/cm$^2$, as described in the embodiment 1 (see Table 1 shown below).

As shown by the measurement results, compared to the electrode foil manufactured by a conventional etching method, the strength of the electrode foil 88 manufactured in accordance with this embodiment is increased by approximately 1.3 times in tensile strength, the leak current is approximately equivalent, and the electrostatic capacitance is increased by approximately 2.5 times.

That is, according to this embodiment, compared to the electrode foil formed by a conventional etching method, the electrostatic capacitance per unit area is significantly increased and further the mechanical strength is also increased. It is believed that those described above are obtained due to a significant increase in the surface area of the electrode foil by the fine voids 28 which are densely and uniformly formed in the valve metal layer 30 and due to strength reinforcement by the strong valve metal layer 30.

COMPARATIVE EXAMPLE

A comparative sample for comparison with the above embodiments 1 to 5 was formed as described below, and the characteristics thereof were measured.

An aluminum foil formed by a rolling method, having a thickness of 80 µm and a purity of 99%, was annealed in an inert gas at 300° C., so that a pre-treatment was performed. This foil was processed by an electrolytic treatment in a mixed aqueous solution of hydrochloric acid, nitric acid, and AlCl$_3$ at a current density of 0.2 A/m$^2$ (50 Hz) for 8 minutes, so that a surface roughing treatment was performed. Subsequently, a chemical conversion treatment was performed in an adipic acid ammonium aqueous solution.

Next, the leak current was measured 30 minutes after the voltage reached a predetermined voltage of 20 V. In addition, the tensile strength of the film was also measured.

In this case, a test piece having a width of 1 cm and a length of 5 cm was obtained by cutting for tensile strength measurement and was pulled at a rate of 10 mm/min by a tensile testing apparatus, so that the tensile strength of the foil was measured.

The following Table 1 is a table in which the embodiments 1 to 5 are compared with the comparative example.

TABLE 1

| | Layer structure | The tensile strength of the foil* (kg/cm), | the leak current (µA/cm$^2$) | the electrostatic capacitance (µF/cm$^2$) |
|---|---|---|---|---|
| the first embodiment | aerosol deposition layer (resin coated Al) on flat rolled aluminum foil | 2.2 | 0.9 | 200 |
| the second embodiment | aerosol deposition layer (resin coated Al) on etched aluminum foil | 1.9 | 1.1 | 250 |
| the third embodiment | aerosol deposition layer (a mixture of resin powder and Al powder) on flat rolled aluminum foil | 1.9 | 3.4 | 280 |
| the fourth embodiment | aerosol deposition layer (resin coated Al, resin coated ceramics) on etched aluminum foil | 1.9 | 2.5 | 265 |
| the fifth embodiment | aerosol deposition layer (resin coated Al) on Flat rolled aluminum foil | 2.5 | 0.9 | 100 |
| comparative example | etched aluminum foil | 1.5 | 1.0 | 40 |

*The foil treated a chemical conversion treatment, Thickness of 80 µm
**The leak current was measured 30 minutes after the voltage reached a predetermined voltage of 20 V.

As shown in Table 1, the tensile strengths of the embodiments 1 to 5 are improved as compared to that of the comparative example. As for the electrostatic capacitance per unit area, compared to 40 µF obtained in the comparative example, in the embodiments 1 to 5, 100 to 280 µF are obtained, that is, the electrostatic capacitance per unit area is improved by approximately 2.5 to 7.0 times.

In addition, in the above embodiments 1 to 5, as the valve metal to be formed into an aerosol, aluminum is used; however, another valve metal, such as titanium, tantalum, niobium, an aluminum alloy, a titanium alloy, tantalum alloy or a niobium alloy, may also be formed into an aerosol and may be deposited (aerosol deposition) on a foil substrate such as an aluminum foil.

In addition, in the embodiments 1 to 5, the aluminum fine particles are coated with an acrylic resin; however, the fine particles may also be coated with a different resin, such as a butyral resin. On the other hand, in the embodiment 4, although the barium titanate fine particles are coated with a butyral resin, it may also be coated with a different resin such as an acrylic resin.

In addition, in the embodiment 4, although barium titanate fine particles are used as the ceramic fine particles, different ceramic fine particles, such as titanium dioxide, may also be used.

In addition, in the embodiments 1 to 5, although the valve metal fine particles to be formed into an aerosol have a diameter of 3 μm, the diameter may be in the range of 100 nm to 100 μm.

According to the present embodiments, since it can be easily performed that the fine voids are densely and uniformly formed inside the strong valve metal layer, which is tightly fixed to the valve metal foil, by selectively removing the resin, while the thickness of the foil approximately equivalent to that of a conventional electrode foil is maintained, an electrode foil for electrolytic capacitor use can be manufactured in which the strength of the foil can be increased and in which the surface area thereof can be significantly increased.

Accordingly, when the electrode foil manufactured in accordance with this embodiment is used, even if the thickness of the electrode foil is decreased, the strength thereof approximately equivalent to that obtained in the past can be maintained, and the capacitance per unit surface area can be significantly increased; hence, an electrolytic capacitor having a small size and a large capacity as compared to a conventional electrolytic capacitor can be realized.

What is claimed is:

1. A method of manufacturing an electrode foil made of a valve metal layer of a first valve metal and a metal foil of a second valve metal supporting the valve metal layer, comprising:

coating fine particles of the first valve metal with a resin to form composite fine particles; forming the composite fine particles into an aerosol; jetting the aerosol to the metal foil in an atmosphere under a vacuum pressure; depositing the composite fine particles onto the metal foil to form an aerosol deposition layer; and removing selectively the resin from the aerosol deposition layer to form the valve metal layer, wherein the removing is performed by using an organic solvent which dissolves the resin but does not dissolve the first and the second valve metals.

2. The method of manufacturing an electrode foil according to claim 1, wherein the second valve metal is aluminum.

3. The method of manufacturing an electrode foil according to claim 2, wherein a surface area of the aluminum is increased by an etching process.

4. The method of manufacturing an electrode foil according to claim 1, wherein the valve metal layer and the metal foil are processed by a conversion treatment after the step of removing.

5. The method of manufacturing an electrode foil according to claim 1, wherein the second valve metal is one selected from a group of aluminum, titanium, tantalum, niobium, an aluminum alloy, a titanium alloy, a tantalum alloy, and a niobium alloy.

6. A method of manufacturing an electrode foil made of a valve metal layer formed with a plurality of first fine particles made of a first valve metal, comprising:

forming a mixture made of the plurality of first fine particles and a plurality of fine resin particles;
forming the mixture into an aerosol;
jetting the aerosol to a metal foil in an atmosphere under a vacuum pressure;
depositing each of the plurality of first fine particles and the plurality of fine resin particles onto the metal foil to form an aerosol deposition layer; and
removing selectively the plurality of fine resin particles from the aerosol deposition layer to form the valve metal layer, wherein the removing is performed by using an organic solvent which dissolves the resin but does not dissolve the first and the second valve metals.

7. The method of manufacturing an electrode foil according to claim 6, wherein the metal foil is aluminum.

8. The method of manufacturing an electrode foil according to claim 7, wherein a surface area of the aluminum is increased by an etching process.

9. The method of manufacturing an electrode foil according to claim 6, wherein the valve metal layer and the metal foil are processed by a conversion treatment after the step of removing.

10. The method of manufacturing an electrode foil according to claim 6, wherein the metal foil is one selected from a group of aluminum, titanium, tantalum, niobium, an aluminum alloy, a titanium alloy, a tantalum alloy, and a niobium alloy.

11. A method of manufacturing an electrode foil made of a valve metal layer and a metal foil, the valve metal layer formed with a plurality of first fine particles made of a first valve metal, the valve metal layer fixed to the metal foil made of a second valve metal, comprising:

coating the first valve metal with a first resin to form the first fine particles; forming a mixture made of the plurality of first fine particles and a plurality of second fine particles, the second fine particle made of a ceramic coated with a second resin and having a smaller diameter than a diameter of one of the first fine particles, the ceramic having a higher dielectric constant than that of an oxide film formed by performing a chemical conversion treatment on the first valve metal;

forming the mixture into an aerosol; jetting the aerosol to the metal foil in a atmosphere with a vacuum pressure;

fixing each of the plurality of first fine particles and the plurality of second fine particles to each other to form an aerosol deposition layer to the metal foil;

removing selectively the first resin and the second resin from the aerosol deposition layer to form the valve metal layer and to form a plurality of voids in the valve metal layer, wherein the removing is performed by using an organic solvent which dissolves the resin but does not dissolve the first and the second valve metals.

12. The method of manufacturing an electrode foil according to claim 11, wherein the second valve metal is aluminum.

13. The method of manufacturing an electrode foil according to claim 12, wherein a surface area of the aluminum is increased by an etching process.

14. The method of manufacturing an electrode foil according to claim 11, wherein the valve metal layer and the metal foil are processed by a conversion treatment after the step of removing.

15. The method of manufacturing an electrode foil according to claim 11, wherein the second valve metal is one selected from a group of aluminum, titanium, tantalum, niobium, an aluminum alloy, a titanium alloy, a tantalum alloy, and a niobium alloy.

* * * * *